United States Patent
Morrison

(10) Patent No.: US 11,615,432 B1
(45) Date of Patent: Mar. 28, 2023

(54) COMPUTER NETWORK BASED, MARKETING SYSTEM AND METHOD FOR REAL ESTATE AGENTS

(71) Applicant: Kyle Morrison, Carmel Valley, CA (US)

(72) Inventor: Kyle Morrison, Carmel Valley, CA (US)

( * ) Notice: Subject to any disclaimer, the term of this patent is extended or adjusted under 35 U.S.C. 154(b) by 0 days.

(21) Appl. No.: 17/142,911

(22) Filed: Jan. 6, 2021

Related U.S. Application Data

(60) Provisional application No. 62/957,469, filed on Jan. 6, 2020.

(51) Int. Cl.
| | |
|---|---|
| *G06Q 30/0204* | (2023.01) |
| *G06Q 50/16* | (2012.01) |
| *G06Q 10/101* | (2023.01) |
| *G06Q 10/0631* | (2023.01) |
| *G06Q 30/0251* | (2023.01) |
| *G08B 21/24* | (2006.01) |
| *G06F 16/28* | (2019.01) |

(Continued)

(52) U.S. Cl.
CPC ....... *G06Q 30/0204* (2013.01); *G06F 16/285* (2019.01); *G06F 40/166* (2020.01); *G06Q 10/06313* (2013.01); *G06Q 10/101* (2013.01); *G06Q 30/0254* (2013.01); *G06Q 30/0271* (2013.01); *G06Q 50/16* (2013.01); *G08B 21/24* (2013.01); *H04L 51/224* (2022.05); *H04L 63/083* (2013.01)

(58) Field of Classification Search
None
See application file for complete search history.

(56) References Cited

U.S. PATENT DOCUMENTS

| 5,235,680 A | 8/1993 | Bijnagte |
| 7,333,943 B1 | 2/2008 | Charuk |

(Continued)

FOREIGN PATENT DOCUMENTS

WO    WO-2006025828 A2 *  3/2006  ....... G06F 17/30864

OTHER PUBLICATIONS

Toni "Navigating the Real Estate Professional Rules", Dec. 2017, The Tax Advisor, pp. 1-20 (Year: 2017).*

*Primary Examiner* — Romain Jeanty
(74) *Attorney, Agent, or Firm* — John Rizvi, P.A.

(57) ABSTRACT

A multidimensional marketing system and method is provided that allows a real estate agent to communicate with a group of homeowners, buyers and sellers via a customized document that is mailed to these subjects. The marketing system is a computer-network-based application or an application operated on a smartphone, a tablet, a computer or other computer network-communicated device. The marketing system helps an agent create a customized document using a variety of templates and tools, create personalized messages for the homeowners, buyers and sellers, and create mailing lists where a particular document would be sent to a particular group of homeowners, buyers or sellers. The marketing system helps an agent to schedule when a mailing should occur and allows the agent to customize their mailing lists. The marketing systems helps identify potential sellers and direct mailing/marketing messages to these potential sellers in order for the real estate agent to obtain their listings.

20 Claims, 25 Drawing Sheets

(51) Int. Cl.
*H04L 9/40* (2022.01)
*G06F 40/166* (2020.01)
*H04L 51/224* (2022.01)

(56) References Cited

U.S. PATENT DOCUMENTS

| | | |
|---|---|---|
| 7,991,703 B1 | 8/2011 | Watkins |
| 8,630,991 B2 * | 1/2014 | Rao ................. G06Q 10/10 |
| | | 707/726 |
| 10,713,325 B2 * | 7/2020 | Hundley ............. G06Q 50/16 |
| 2004/0078374 A1 * | 4/2004 | Hamilton ........... G06F 16/2452 |
| 2004/0143450 A1 * | 7/2004 | Vidali ................ G06Q 40/025 |
| | | 705/38 |
| 2005/0288957 A1 | 12/2005 | Eraker et al. |
| 2006/0167710 A1 * | 7/2006 | King ................ G06Q 30/0601 |
| | | 705/316 |
| 2006/0200384 A1 | 9/2006 | Arutunian et al. |
| 2009/0192862 A1 * | 7/2009 | Hoggard ........... G06Q 30/0241 |
| | | 705/26.1 |
| 2009/0307050 A1 | 12/2009 | Fournier |
| 2010/0019482 A1 | 1/2010 | Kumagai et al. |
| 2010/0217686 A1 * | 8/2010 | Craig .................... G06Q 30/02 |
| | | 705/26.1 |
| 2011/0010302 A1 * | 1/2011 | Faudman ............. G06Q 30/02 |
| | | 705/313 |
| 2012/0066061 A1 | 3/2012 | Clement |
| 2014/0316949 A1 | 10/2014 | Copley |
| 2015/0100508 A1 * | 4/2015 | Binion .................. G06Q 10/06 |
| | | 705/313 |
| 2016/0027051 A1 * | 1/2016 | Gross .................... G06V 20/20 |
| | | 705/14.54 |
| 2016/0048934 A1 * | 2/2016 | Gross ................ G06Q 30/0643 |
| | | 705/313 |
| 2016/0092959 A1 * | 3/2016 | Gross ................ G06Q 30/0625 |
| | | 705/26.62 |
| 2016/0292763 A1 * | 10/2016 | Goodrich ........... G06Q 30/0641 |
| 2018/0308140 A1 * | 10/2018 | Shkipin ............. G06Q 30/0613 |

* cited by examiner

COMPUTER NETWORK BASED, MARKETING SYSTEM AND METHOD FOR REAL ESTATE AGENTS

CROSS-REFERENCE TO RELATED APPLICATIONS

This application claims the benefit of U.S. Provisional Patent Application Ser. No. 62/957,469, filed on Jan. 6, 2020, which is incorporated herein in its entirety.

FIELD OF THE INVENTION

The present invention relates generally to marketing systems for real estate agents and homeowners, and more particularly, to a computer-implemented, real estate marketing system and method for real estate agents to create customized mass mailing documents, customized mailing lists and separate homeowner, real estate buyer or seller websites.

BACKGROUND OF THE INVENTION

The real estate market routinely mails postcards or newsletters to homeowners to tell them about a new property for sale, recent properties that have sold, or to solicit a homeowner to list their property with the real estate agent. These generic postcards and newsletters usually provide a limited amount of market information about a homeowner's city or neighborhood. More specifically, these postcard and newsletters are not customizable by the agent and contain only simple generic market information such as homeowner tips, cooking recipes or sports schedules, all of which are totally unrelated to providing homeowners with a quality overview or meaningful insight of their neighborhood or city's market conditions.

When an agent sends a generic real estate newsletter to homeowners one of the major shortcomings of these publications is that they contain little or no relevant data or analysis of the homeowner's local market. Since a home is typically a family's largest asset, it makes sense that homeowners will want the most reliable, comprehensive and meaningful analysis of not only what their property's current market value is, but also what the general market conditions are in their city and neighborhood to help homeowners understand when it may be the best time to put their home on the market.

The real estate industry is full of "Just Sold" or "Just Listed" mass mailing postcards and generic real estate newsletters. From a homeowner's perspective, these are generally ineffective primarily due to their lack of quality content, thereby they fall into the category of junk mail. The reason these types of mailings are considered junk mail or have little to no lasting value to homeowners is that they don't provide detailed and understandable market data that gives the homeowner a deep and clear understanding of the market conditions of the city and/or neighborhood, and, more specifically, how the homeowner's property fits into the current local market pricing. The real estate industry's current mass mailing (farming) products woefully lack a well rounded and cohesive collection of basic data points necessary for homeowners to make sound data driven decisions. In addition to lacking meaningful, easily understood market data, the current mass mailing tools available today do not give the agent the ability to quickly and effortlessly customize their mailings with their own direct experience and market knowledge, nor do they give the agent the ability to communicate directly and/or personally to any individual homeowner.

Accurately deciphering current real estate market conditions is a complex, data intensive process that most homeowners are not capable of generating on their own. If they do attempt to understand the market conditions, critical mistakes can be made in their analysis giving skewed or inaccurate results. In addition to not having the necessary technical background or training to create an accurate market analysis, most homeowners do not have access to all the data points that are required to accurately depict the current market conditions and prices. Hence, many homeowners turn to online services such as Zillow, Trulia, Realtor.com or Redfin to obtain a current market valuation of their property.

Although all these online services attempt to provide ballpark individual property valuations, they are also known to be wildly inaccurate, primarily due to the fact that they base their analysis solely on limited data points, i.e., prior sales of other similar properties in that zip code based on determined parameters such as beds, baths, square footage, etc., which provides at best, a simple and incomplete one dimensional analysis. It is literally impossible for these mass aggregator services to capture or know such critical factors as the level and quality of amenities a home has or the level or quality of recent remodels such as new or updated kitchens, new or updated bathrooms, room or garage additions, landscaping improvements or other types of major home improvements that have been made to the property.

As an example, Zillow's "Zestimates" property valuation service provides only a simple snapshot and a rudimentary analysis of a property's current value and is just the first step of several steps a homeowner needs to take to obtain a clear and concise understanding of their city and neighborhood's current market conditions. Market analysis is complex in that property values can vary dramatically from neighborhood to neighborhood and even from block to block on the same street. This may be due to factors such as changes in a property's views, proximity to a park or beach, proximity to a busy street, flat or hilly terrain, etc.

In addition, today's generic mass mailing products and services limit an agent's ability to manage their mailings on an individual basis. The current mass mailing systems do not offer the ability to target a particular homeowner or a group of homeowners, or to promote any single property of an agent. So, generic mass mailing systems are extremely limited in their flexibility, hence, are less effective in delivering an agent's message.

Agents need and want to make each and every marketing dollar they spend go farther and make a lasting and meaningful impact on the homeowners that receive the postcards. Postcards only promote one listing at a time, and generic newsletters lack any flexibility in allowing the agent to customize the mailing, much less, individually select and promote their market activity, such as listings, escrows, recent sales and future open houses. These are significant shortcomings of these systems and a poor marketing value for agents.

Agents spend a lot of time holding their listings open for the public to come through and experience the property for themselves. Open houses are one of the most productive ways an agent can meet potential homebuyers and local neighbors that might be thinking of selling their homes. Typically, open houses are held by the agent that has the listing agreement with the sellers and/or owners. Since open houses are so productive in meeting other local homeowners and potential buyers, advertising them is a very effective way for agents to get more people to come through the house. One of the more significant challenges for these listing agents is getting the word out to local homeowners about their open houses. Many agents typically advertised their open houses in the local newspapers or cheap door hangers. However, door hangers are both time consuming to deliver and not always welcomed by homeowners, and many newspapers have gone out of business, making it a challenge to advertise an open house. There is not any product or service in today's real estate market that addresses the problem of advertising the open houses of an agent to all surrounding homeowners. This is a significant shortcoming.

Moreover, no mass mailing system within the real estate industry gives an agent the ability to individually reach out to homeowners and catch their attention enough that they feel they are personally talking or communicating with the agent. Agents need this capability to create a connection with the recipients of their mailings which then improves the trust and familiarity between the homeowner and the agent. This in turn increases the likelihood that the homeowner will contact the agent when they want to put their property on the market.

What is needed is a real estate system that solves one or more of the aforementioned problems and shortcomings of the current, real estate mass marketing campaigns.

SUMMARY OF THE INVENTION

The present invention is direct to a computer-implemented, multidimensional system and method that gives a real estate agent flexibility over documents mailed to a homeowner, buyer or seller, and over the group of homeowners, buyers or sellers that will receive the documents. The present invention also provides agents with a set of tools that enable them to communicate directly and personally with any individual homeowner, buyer or seller. The present invention provides a complete start-to-finish automation, user-intuitive web-based agent interface, highly customizable contents, unique data presentations using a proprietary agent type visual schema, automated and customizable agent property promotions, depth and breadth of market analysis, or full integration with custom homeowner websites and agent home evaluation tools. Wherein all of the modules in the present system work in symmetry to create a cohesive interface with the audience or agent using it, while simultaneously enhancing the agent's ability to effectively communicate with homeowners educating them on market trends that favor them.

The present invention is multidimensional in that the first dimension comprises a document (such as PMD (precision marking document)) that is mailed to and received by one or more homeowners, or real estate buyers or sellers (hereinafter referred to also as subjects). The second dimension is that the subject enjoys reading and referring back to the document as a valuable source of real estate market information, and can thereafter accept the invitation given by the agent to visit and sign in to a custom-built website with an array of search and analytical tools for the subject. The third dimension is that the homeowner, buyer or seller has the ability to sign onto a website of their own provided by the system and can see all the properties that the agent has personally visited and previewed. Each property the agent has previewed may include a brief statement next to each property with information about the property and an invitation to the subject to contact the agent. The subject is thereby provided with a direct link to the agent, and can contact the agent if the subject is interested in using the services of the agent to sell or buy a home or other real estate property.

In another aspect, the system can provide an Internet, web-based solution that is password protected which gives each agent the ability to highly customize each document that is mailed to homeowners, buyers or sellers.

In another aspect, the system can allow the agent with the ability to create custom personalized notes to any individual homeowner, buyer or seller, or group of homeowners, buyers or sellers that are included in the document mailed to these subjects.

In yet another aspect, the system can schedule mailings to the homeowners, buyers and/or sellers.

In another aspect, the system can prompt the agent (such as via emails and text messages) for deadlines, required approvals and/or billing charges.

In another aspect, the system may be configured to capture, group and print the agent's current listings, escrows, recent sales and open houses.

In another aspect, the system can be configured to give the agent the ability to select, promote, and call attention to the agent's properties by inserting custom information in the documents that will be mailed.

In another aspect, the system may be configured to gather and display a wide variety of key, real estate market data points and convert them into easy-to-understand tables, charts, graphs, newsletters, spreadsheets or reports. The system thereby can save an agent dozens of hours to format, generate, print and mail.

In another aspect, the system may be configured to provide an agent with daily email or text updates on current market changes within an area of interest to the agent, including for example, houses recently listed, houses that have sold, houses put into escrow, and houses that are canceled.

In another aspect, the system may be configured to mail the customized document to property owners and invite each homeowner, buyer or seller to visit a respective custom-tailored website, such as by way of using a special user name and password that is provided within the document mailed to homeowners.

In an illustrative implementation of the invention, a marketing system accessible by a real estate agent via an electronic device in digital communication with a computer network comprises:

an agent's property list (APL) selection module for displaying a set of properties, receiving one or more selections from an agent to select a subset of one or more properties from said set of properties, and saving the selected subset of one or more properties in a memory;

a tagging module for displaying the selected subset of one or more properties, receiving one or more instructions from an agent to group one or more of the properties comprised in the subset into one or more tagged groups, and saving the one or more tagged groups;

an editing module for adding and saving a message associated with the one or more tagged groups;

a document creation module for creating and saving one or more documents configured to be mailed to the one or more properties in the subset or to the one or more properties in the one or more tagged groups, each of the one or more documents comprised of different information;

a mailing module for associating the one or more documents with the one or more tagged groups into one or more mailing lists, and saving the one or more mailing lists, wherein each of the one or more mailing lists is comprised of the one or more documents and the one or more tagged groups;

a scheduling module for scheduling a date and/or time for when the one or more mailing lists is sent to a printer, where the printer will create a physical version of the one or more documents including the information associated with a particular document, a name, an address, and any message associated with the one or more tagged groups; and a prediction module for predicting which homeowners may be interested in selling their house and for managing a marketing campaign to target such homeowners.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 5 presents an example of screenshot associated with a mailing list;

FIGS. 7-24 present screenshot examples associated with the marketing system.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

There is no intention to be bound by any expressed or implied theory presented in the preceding technical field, background, brief summary or the following detailed description. It is also to be understood that the specific systems, devices and processes illustrated in the attached drawings, and described in the following specification, are simply exemplary embodiments of the inventive concepts defined in the appended claims. Hence, specific characteristics relating to the embodiments disclosed herein are not to be considered as limiting, unless the claims expressly state otherwise.

The words "real estate agent" and "agent" are used interchangeably throughout the present disclosure. The term "Property" refers to a certain tract or bordered piece of land, and includes any house and/or any other structure on the land, such as a separate garage, barn, silo, pond, lake, pool, etc., and/or the land itself. A "table" and a "list" are used interchangeably herewith, and can comprise one or more rows and columns of information.

Figure 1:
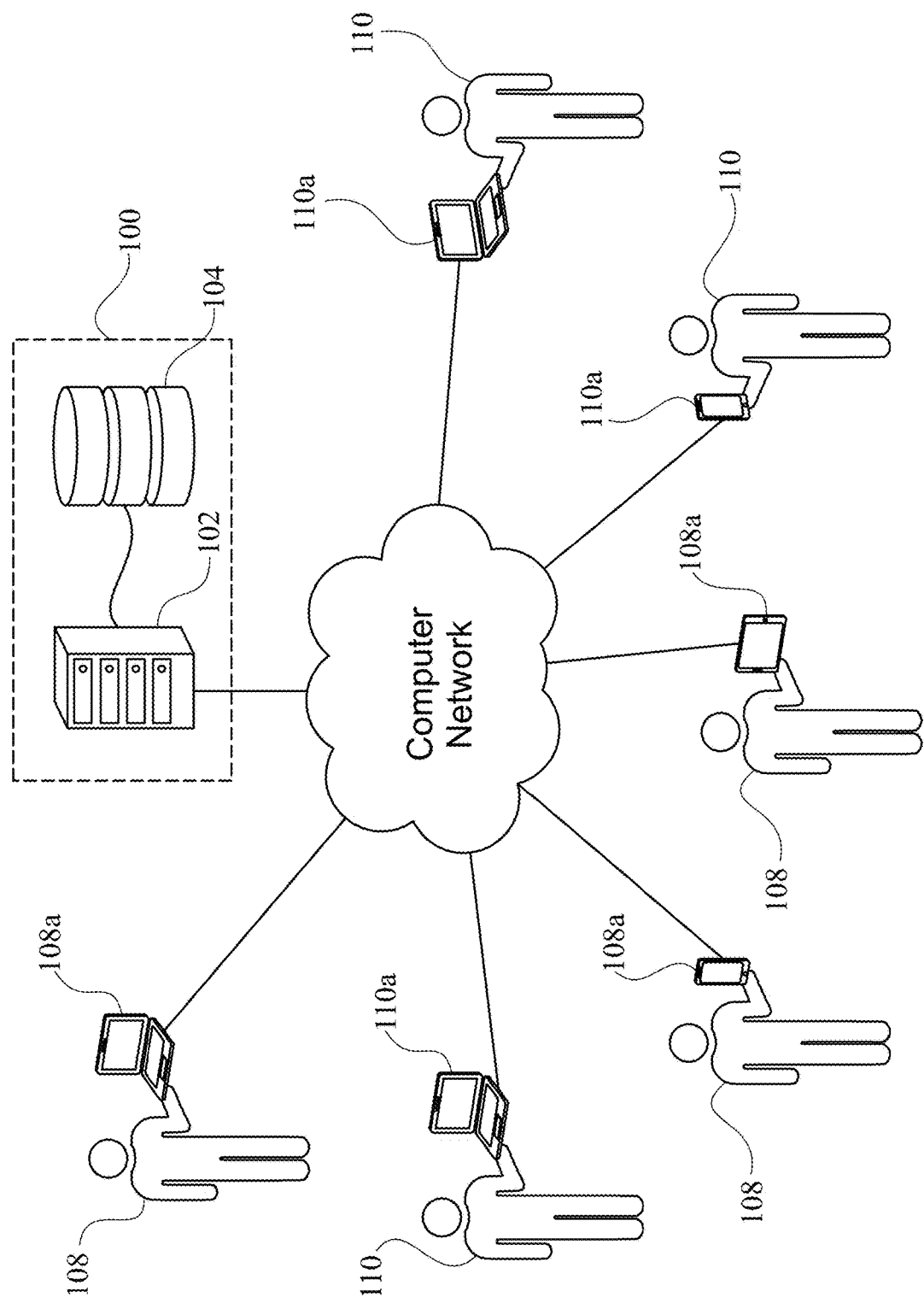
FIG. 1 presents a block diagram of a marketing system in accordance with an illustrative embodiment of the present invention, including the system connectivity to the Internet, real estate agents and homeowners or other users.

As shown in FIG. 1, the present invention is directed toward a marketing system 100 for real estate agents and homeowners. The marketing system 100 can be operated on any type of local or distributed computerized system, such as, but not limited to, one or more servers and/or computers located at a company's facilities, or distributed across a geographic extension with in different servers in different locations. For instance, the marketing system 100 depicted herein is provided by one or more servers 102 and electronic data storage memories 104, the one or more servers 102 comprising one or more processors running one or more websites and/or applications providing remote- or cloud-based features or steps of the method and system that will be described hereinafter. The marketing system 100 is connected to a computer network 106 (e.g., the Internet). In turn, real estate agents 108 and homeowners 110 can access the marketing system 100 using respective real estate agent electronic devices 108a and homeowner electronic devices 110a configured to communicate with the marketing system 100 over the computer network 106. The electronic devices 108a and 110a may include one or more processors and electronic data storage memories configured to run software programs or applications performing local steps or features of the marketing system and method of the present disclosure. The electronic devices 108a and 110a may include a phone, tablet, or computer, for instance, and without limitation.

Using their respective electronic devices 108a and 110a, real estate agents 108 and homeowners 110 access the marketing system 100 via an electronic account and a password, where after logging in at one or more URL's (Uniform Resource Locators or website addresses), each real estate agent 108 and homeowner 110 enters information (if required) about the real estate agent or homeowner, respectively, and are each assigned a separate account. Multiple user interfaces, such as, but not limited to, graphical interfaces (GUIs) or screens and/or audible messages, may be presented to the real estate agents 108 and homeowners 110 via a user interface (e.g., a screen) comprised in their respective electronic devices 108a and 110a, and may be used in order for the marketing system 100 and the real estate agents 108 and homeowners 110 to communicate with one another.

The user interfaces presented to the real estate agents 108 and homeowners 110) on their respective electronic devices 108a and 110a navigational controls and selection controls including, but not limited to, screens, menus, buttons, drop-down menus, checkboxes and interactive voice commands. The agents 108 and the homeowners 110 use and operate these navigation controls and selection controls to move between screens of the website or application, enter information, select information, and select a function or functions that they want to perform. The navigational controls and selection controls are used to implement the processes, functions or tasks as described herein.

Figure 2:
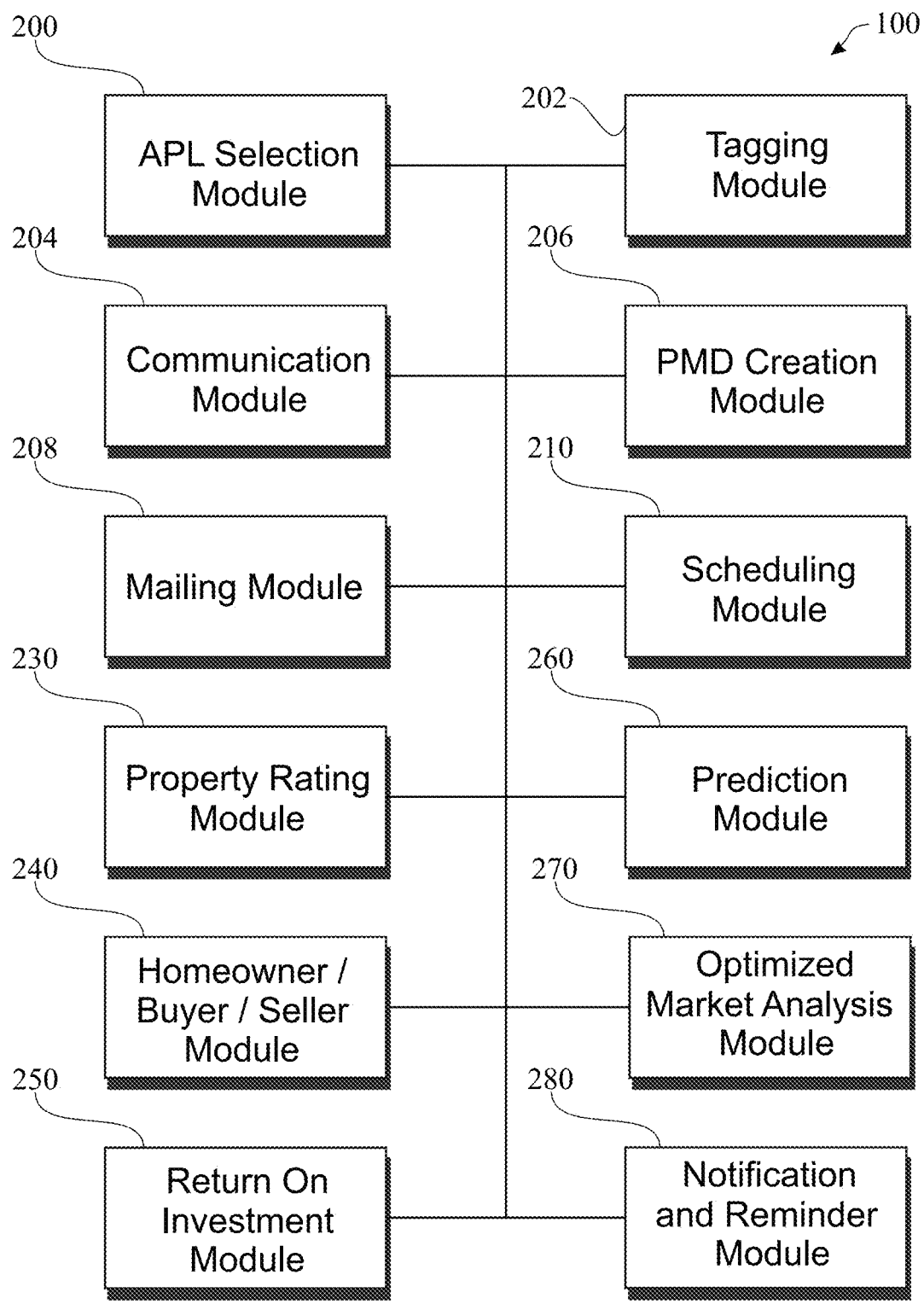
FIG. 2 presents a block diagram of the different modules of the marketing system according to one embodiment of the present invention.

As shown in FIG. 2, the marketing system 100 of the present embodiment comprises an APL (Agent's Property List) selection module 200, a tagging module 202, a communication module 204, a PMD creation module 206, a mailing module 208, a scheduling module 210, a property rating module 230, a homeowner/buyer/seller module 240, a return on investment (ROI) module 250 and a prediction module 260. The different modules can run on the same server; alternatively, the different modules may be distributed in different servers in the same system, wherein there are one or more servers for each module, and further wherein the server(s) can be located in the same system or located in different remote systems. Different modules can be combined into one module and/or one or more functions performed in one module can be included in a different module.

All the modules in the marking system 100 can be incorporated into a single application that resides on the real estate agent electronic device 108a and homeowner electronic device 110a, where the application used by the real estate agent or homeowner interfaces or communicates with the marketing system 100 over the computer network 106. Alternatively, all or some of the functions performed by the modules may be separated into different, separate or inter-related applications, for example, one application may be used for implementing the property rating module 230, while another separate application may be used to implement the APL selection module 202, the tagging module 202, the communication module 204, the PMD creation module 206, the mailing module 208, and the scheduling module 210. In some embodiments of the invention, applications run on the real estate agent electronic device 108a and homeowner electronic device 110a may be different, i.e. may not include the same modules.

Agent's Property List (APL) Selection Module 200

The APL selection module 200 is mainly responsible for helping a real estate agent 108 to create an Agent's Properties List (APL), where the APL is the main list of homeowners and/or properties to which the real estate agent will communicate to solicit business. More specifically, the real estate agent can target the homeowners within the APL to receive a PMD (precision market document—described below) in the hope that the homeowners would decide to hire the real estate agent to help sell their home. For this purpose, the APL selection module 200 allows a real estate agent to select a set of properties and/or homeowners from a database of existing properties, and create an APL containing the selected set of properties and/or homeowners. The APL selection module 200 can also allow a real estate agent to create, and store, more than one APL.

In some embodiments, the APL selection module 200 can help a real estate agent 108 select a number of properties and/or homeowners from one or more areas displayed on a map presented to the real estate agent 108 on a screen or display of the real estate agent electronic device 108a. The agent can locate the area of interest by checking one or more boxes that correspond to the areas, i.e., neighborhoods, of interest, which may be directly tied to the ROI module and analysis module. In an alternative embodiment, the agent may locate an area of interest by entering a zip code, or by typing in one or more street names, the name of a city, or the name of a particular neighborhood, region or other known area into the user interface provided in the real estate agent electronic device 108a. The agent can navigate the map using user-operable controls such as, but not limited to, arrows, zoom-in and zoom-out buttons, and drag features provided in the aforementioned user interface. The map shown on the display will show individual properties on a street, including homes and businesses.

It must be noted that, unless expressed otherwise, throughout the present disclosure, actions such as "entering", "inputting", and the like refer to the user (real estate agent 108 or homeowner 110) entering information into the software program or application running on their respective electronic device 108a, 110a using the user interface provided on their electronic device 108a, 110a. In turn, unless expressed otherwise, throughout the present disclosure, actions such as "selecting", "choosing", "tagging", "blocking", "activating", "deactivating", "creating", and the like refer to the user (real estate agent 108 or homeowner 110) carrying out said actions using the aforementioned and other user-operable controls comprised in the user interface running on their respective electronic device 108a, 110a. Furthermore, unless expressed otherwise, any digital information described hereinafter as being "saved", "stored", "downloaded", "retrieved", "uploaded", "read", "written" or carrying out a similar action may be saved, read from or written to a local memory (i.e. the memory comprised in the electronic device 108a or 110a being used by the applicable user who originated the action), remotely or in the cloud (i.e. in the storage memory 104 of the marketing system 100), or both.

In one embodiment, the APL selection module 200 has certain pre-set areas on the map that have been set and cannot be changed. The real estate agent can look on the map at each of the pre-set areas and can select those pre-set areas that the real estate agent wants to include in the APL. When an agent selects a pre-set area, the APL selection module 200 retrieves and displays the number of homeowners in that pre-set area, and if applicable, a licensing fee associated with including this pre-set area in the agent's APL, and the total cost associated with all the pre-set areas that have been selected by the agent; in different embodiments, this information may be stored in (and thus retrieved by the APL selection module 200 from) the memory comprised in the real estate agent electronic device 108, the memory comprised in the marketing system 100 (over the computer network 106), or both.

The retrieved homeowners in the pre-set area can be displayed in map mode or table mode, i.e. on a map or table (chart, list), respectively, which is presented on the display of the real estate agent electronic device 108a. Via the user interface provided by the software program or application running on the real estate agent electronic device 108a, the real estate agent 108 can switch between the map mode and the table mode. In the map and/or table modes, the individual properties may be shown or listed along with other information such as the number of homes and information about each property (for instance, and without limitation, the style of the home, address, owner's name, size of house, current market price, etc.).

The APL selection module 200 in the map mode can display areas that are available and unavailable to be selected. These different areas can be shown in a color scheme or other known conventional fashion to indicate that they are either available or unavailable. Green areas may indicate an available area for selection, while a red or "X" area may indicate an unavailable area. By examining the map on the screen, the real estate agent can select these pre-set areas by any way known in the art to create a customized APL. For example, the real estate agent may select certain neighborhoods within a city by clicking on a particular area and then clicking on an "Add" (i.e., add to APL) button. These areas can change colors after being selected and can be listed on the screen to show the areas selected.

In another embodiment, the real estate agent can enter information in the APL selection module 200 to find designated properties meeting a certain criteria. The information can comprise, for instance and without limitation, a zip code, a neighborhood name, the size of the property, the size of the house, the current market value of a house, the number of bathrooms or bedrooms in the house, when the house was last sold, whether there is a garage, a pool, a shed, etc.

For example, the agent can search a particular zip code for properties selling over a certain amount or within a certain range. The real estate agent enters the zip code and the minimum price or range of prices of a property into the APL selection module 200. The APL selection module 200 searches one or more databases of properties in the selected zip code, wherein the database(s) may be comprised in the memory of the real estate agent electronic device 108*a* and/or the memory of the marketing system 100. For each property in the zip code, the APL selection module 200 computes the current market value of the property. The current market value may be based on a variety of factors, such as, but not limited to, the last known selling price, current price trends in the market, the condition of the house and/or property as shown on Google Maps or other image-storing application or service, etc. Based on the current value of each property within a particular zip code, the APL selection module 200 creates a list or tables of properties that meet the pricing criteria selected by the real estate agent.

The APL selection module 200 allows the real estate agent to search for properties in map format or in list or table format, and also allows switching between formats, as mentioned heretofore. Map format may show the properties from a birds-eye or overhead position in a photograph format or a representational format. The table or list format may show the properties in a table where each row comprises a different property or homeowner, while the columns are features or characteristics of the property. The properties to be added to an APL can be selected in map format or table format. The real estate agent can select all the properties in the list and/or table format by using a select-all checkbox, or select individual properties by selecting the checkbox next to the property, or by clicking on the properties itself. In another embodiment, the real estate agent can view a map (on a screen from the website) and select individual properties, and/or properties on a particular stretch of a street, and/or all properties on a particular street.

Once one or more available areas have been selected and added to a real estate agent's APL, the APL selection module 200 will display on the screen of the real estate agent electronic device 108*a* the number of properties that have been selected in the APL. The APL selection module 200 can display the properties in map format, in list format, in side-by-side format, or in a different arrangement. The agent can use the APL selection module 200 to sort and display the properties within the APL via one or more of the characteristics or features of the property, including but not limited to homeowner's name, street address, last known selling price of a property, date of when the property was sold last, current market price, square footage of the house or other structure on the property, number of bedrooms, number of bathrooms, pool, garage, etc. The agent reviews and determines if the properties and/or homeowners in the list are those properties that the real estate agent wants to target in its mass marketing campaign. If not, the agent can go back to the select different areas on a map or table, and deselect other areas. The reiterative process allows the agent to create an APL of the agent's own choosing.

Once the real estate agent is pleased with the selection of properties within the APL, the real estate agent clicks on an "approve" or "confirm" button on the screen, whereby the APL selection module 200 saves those properties into an APL and associates it with the account of the agent. The APL can be viewed and listed on a screen by the APL selection module 200. The APL selection module 200 gives the agent the option of copying the APL, saving the copy, and renaming the APL. In different embodiments, the APL may be saved locally (i.e. in the memory comprised in the real estate agent electronic device 108*a*), remotely or in the cloud (i.e. in the memory of the marketing system 100), or both.

There may be a licensing fee associated with the number and location of properties in the APL. Before the agent clicks on the "approve" button or otherwise approves of the APL, the licensing fee charged by the APL selection module 200 may be shown on the screen. If the licensing fee is too high, the real estate agent can go back and deselect and remove different areas from the APL so that the licensing fee is reduced to an amount that the real estate agent is willing to pay. The APL selection module 200, through one or more screens, gives the agent the ability to pay for the selected APL, and provides the real estate agent with a visual and/or audible confirmation that the APL is now licensed for use in the marketing system 100.

The APL selection module 200 also is responsible for updating the status of properties within the stored APL, such as updating the status of the property to "for sale", "not for sale", sold", "expired listing", "listed with another agent", etc. The APL selection module 200 can update daily, weekly, or according to any other time period as selected by the agent. The agent can select in the APL what information should be updated. For example, the agent may want to know about if another agent is representing a homeowner to sell their property, or that a listing with another agent had expired. The agent can select one or more fields in the APL to be updated on a periodic basis.

When updating fields in the APL, the APL selection module 200 accesses or interfaces with the Multiple Listing Service (MLS), and/or other public or proprietary databases, generally over the computer network 106, and checks the properties within an agent's APL against the information in the database(s). Alternatively, the APL selection module 200 can download the current information from one or more databases and store it; in different embodiments, the information may be stored locally (i.e. in the memory comprised in the real estate agent electronic device 108*a*), remotely or in the cloud (i.e. in the memory of the marketing system 100), or both. When the current information shows that there has been a change in the information, and the field has been selected to be updated by the agent, the information is changed in the APL. Also, the current information is compiled into a table, list or some other notification, and a date is associated with the changes. The agent can view and search what changes occurred on what date by accessing the separate files. The APL selection module 200 can notify the agent of the changes if this notification feature is turned on by the agent. Notifications are controlled in the notification and reminder module 280.

The APL selection module 200 in conjunction with the tagging module 202 (described below) tags and blocks mailings to those homes that are currently listed by another agent and homes that are in escrow with another agent. Tagging these properties prevents a PMD from being mailed to a homeowner who is represented by a competing agent, thus saving the agent money on mailing costs.

Tagging Module 202

The tagging module 202 is mainly responsible for creating and managing subsets of homeowners and properties from the APL. These tagged subsets of the APL allow the real estate agent to target specific groups of homeowners and/or properties for a particular message, event, or some other reason.

The real estate agent can view the properties within the APL for instance by logging into the website using the real estate agent electronic device 108a and accessing the APL. The tagging module 202 allows an agent to manually tag any number of homeowners/properties within the APL using a drop-down list or other user-operable tagging feature comprised in the user interface, such as, but not limited to, (i) a numerical list (ii) a special check-box; (iii) a tagging mode where the agent can click on one or more properties when in the tagging mode to tag a certain homeowner or property; (iv) a drag-and-drop feature where houses or properties are dragged and dropped into different tagged lists or groups; or (v) a search feature for any of the conventional information associated with the properties or homeowners. Properties and/or homeowners can belong to one or more tagged lists or groups, and can be color-coded to distinguish a group of tagged properties from another group of tagged properties. All groups of tagged properties can be saved into separately named files.

The agent can create one or more tagged lists or groups from an APL. Each of the tagged lists or groups can be separately named by the real estate agent. The tagging module 202 allows the agent to create any number of groups of homeowners with custom group names. These separate tagged groups can them be searched for and/or organized in whatever order the agent chooses so the agent can apply one or more special messages or notes to an entire group without having to go into each individual homeowner's record to apply them.

The tagging module 202 can also be used to tag those properties or homeowners that the agent is currently doing business with; for example, the tagging module 202 can be used to tag the current listings of the agent, current escrows, and all recent and past homeowners where the agent helped the buyer or seller. The agent can go through the APL and tag those properties from a drop-down list comprised of, for example, "current listing", "escrow", "sold", "buyer", or other terms used in the real estate industry.

If prompted by the real estate agent to execute an auto-capture feature, the tagging module 202 connects to the separate, external MLS (multiple listing service) database(s) and/or another external proprietary or public database associated with the real estate agent or the realty group. The tagging module 202 searches these databases based on the agent's name, licensing number or other individual identification information to find all the agent's new escrows, new listings, and recent sales. Alternatively, the tagging module 202 may search the properties in the APL and determine if the real estate agent is associated with these properties. The tagging module 202 saves this information from the MLS and/or other databases into a separately tagged file or alternatively, shows this information in a table or list. Thereafter, the tagging module 202 compares the information to the APL and highlights those properties where the agent is already involved or has been involved. The comparison may involve comparing the agent's name or license number to information about the agent associated with the properties. The tagging module 202 displays these properties to the agent enabling the agent to select (or delete) any of the proposed tagged properties, and to change the sort order of how the properties and/or homeowners are displayed.

Either upon the prompt of an agent or as scheduled (via the scheduling module 210 described below) the tagging module 202 accesses the MLS database and other proprietary or public databases to locate properties represented by other agents. The tagging module 202 finds properties in the APL that are already represented by another agent by analyzing the information in the MLS to see if another agent is already representing a homeowner. The tagging module 202 highlights (on the screen of the real estate agent electronic device 108a) those properties that should be blocked because those properties are already represented by another real estate agent. In addition, the agent can manually block any property in the APL by selecting the property and selecting the "block" feature from a drop-down box or similar control feature. These blocked properties are blocked from a mass mailing of a particular PMD as described below. For example, the agent may want to block a listing that is in another city or area/neighborhood or a listing that is not in the price range of the area they are mailing. This helps the agent maintain a consistent look with the properties the agent is promoting within a particular area or neighborhood.

The tagging module 202 helps the agent build separate tagged lists. The agent can quickly search for any homeowner by any of the real estate information, including first and/or last name, address, sale price, list price, listing agent, selling agent, parcel number, a certain tag, and dozens of other search parameter possibilities giving the agent a significant amount of control over an otherwise difficult to manage list.

The real estate agent can use the tagging module 202 to pre-filter the whole APL or a tagged group of homeowners to block any homeowners in the APL or the tagged group that should not be mailed due to any applicable federal, state or city regulations or ethics. This block group may also include businesses that reside within the APL. Alternatively, the real estate agent can select the tagging module 202 to pre-filter by turning on the auto-block feature. Blocked homeowners can be shown in a variety of ways, including for example, a color-coded scheme, a strike-through of the name, a status indication showing "block", etc. The tagged lists are highly customizable by the agent in that any property, homeowner and/or address can be blocked from being mailed.

Using the tagging module 202, agents can download their existing buyers and sellers contact list, which may be stored locally (i.e. in the memory comprised in the real estate agent electronic device 108a), remotely or in the cloud (i.e. in the memory of the marketing system 100), or both. This contact list is used for marketing and all future client relationship management (CRM) actions. Once downloaded, the system displays prospective buyers and sellers, and presents the option for the agent to classify each client into specific categories or additional classes of tagged groups as created by the agent. The agent can rank the buyers and sellers using an existing rating system, or the agent to create their own rating system. The tagging module 202 also give the option to the agent to identify whether the client came from an open house, a personal sphere of influence, referral, advertisement, website, what city and/or areas or neighborhoods the client is looking in, their price range.

Communication Module 204

The communication module 204 is mainly responsible for helping a real estate agent to (i) create and add a personal note to all properties in the APL, to a particular individual, or to a tagged group of homeowners; (ii) save past notes; (iii) view past notes; (iv) attach notes to a PMD; (v) integrate with the agent's email, Facebook, Instagram and/or other applications and accounts of the agent; and (vi) create and update a blog of the agent.

Via the user interface of the real estate agent electronic device 108a, the agent can access the communication module 204 to add a personal note to all homeowners in the APL, to a single homeowner, and/or to each of the homeowners in a tagged group. The personal note can be printed on the PMS (described below) or sent electronically. Using the communication module 204, the agent can select a homeowner and type in a message. If a note is added to a group of tagged properties, the note will be included for that group in the PMD. If a note is added to an individual, the note will be only sent to that individual on that individual's PMD. These notes and comments can be saved, copied and edited.

The communication module 204 maintains a complete history of all personal notes the agent has sent to each homeowner or group of homeowners so the agent can view which notes have been previously sent and the dates that each of the notes had been sent. These notes can be sorted and viewed via the creation date, the date when edited last or any other sorting criteria known in the art that is pertinent to sorting and viewing notes. The communication module 204 enables the agent to select any homeowner in any size mailing list and seamlessly send a personal note directly to that homeowner which will be printed on a PMD and then mailed to one or more designated homeowners.

By using the communication module 204, the agent can click on any previous notes that were sent. This gives the agent a complete history of all personal notes to each homeowner at their fingertips. This feature helps to prevent the agent from duplicating the same personal message to any one homeowner and helps remind them of past communications. If the agent chooses to write a personal note to any individual homeowner(s) and also decides to write a global note to all or a specific group of homeowners, then the system maintains the personal notes and only applies the global notes to all the other homeowners.

Using the communication module 204, the agent can view all the homeowners in the APL or a tagged group of homeowners. The agent can select one or more homeowners and write them a personal note that will be printed on the PMD for the homeowner to read. The agent also can send a note that is indicated to be broadcast to all homeowners. This tool enables the agent to further personalize the PMD by writing personal notes to neighbors, friends, listing prospects, associates, etc. The communication module 204 allows the agent to select where the note will appear on the PMD (e.g., on the cover letter page under the agent's signature, or on the front page under the homeowner's mailing address).

The communication module 204, when this function has been selected by an agent, inserts a homeowner's first name in the greeting of each personal note. Alternatively, the agent can manually change a name to one the agent knows to be more personal. For example, the agent may change the name James to Jim or Jimmy', or Jessica to Jess', etc.

The communication module 204 may additionally display a counter that shows the agent which homeowners they have sent personal notes to, the number of times and the dates of when the note were sent. It also creates a full history of all messages or notes that were sent out to homeowners so the agent can refer back to any of past notes.

The communication module 204 can integrate with the email, Facebook, Instagram and/or other accounts or applications used by the real estate agent. This allows the real estate agent to send emails, texts or voicemails to any particular homeowner when the emails and/or phone numbers are accessible, known and authorized for use by the real estate agent. This also allows the agent to be fully integrated and in sync with all of the applications used by the agent.

When the agent receives an email from a homeowner, the communication module 204 will search the APL, determine if the homeowner is in the APL, and then associate the email address with the homeowner. If the homeowner is not part of the APL, the homeowner can be added to a list or table of homeowners not part of the APL.

The communication module 204 provides agents with homeowner tips that can be used by the agent when they send a homeowner a personal note. These homeowner tips help the agent come up with ideas as to what to write to their homeowners in their communications. For example, if the homeowner/buyer/seller module 240 identifies a group of homeowners who use their websites frequently, the communication module 204 can prompt the agent to send a group note to these homeowners with a specific tip that would resonate with those homeowners such as for example, "Did you know: By clicking on any photo you not only see additional photos of the property but you can also save and email that property by simply clicking on the save and email buttons at the bottom of the photo."

The communication module 204 keeps track of each tip that was used by an agent, rotates suggested tips, and will suggest another new tip for the agent to send out the next time. The communication module 204 will flag if the same tip already had been used for a homeowner or group of homeowners.

The communication module 204 helps to identify homeowners who have something in common with the agent, such as, but not limited to, the city where the agent grew up, favorite cities the agent has visited, names of the schools attended, etc. The agent's personal information is entered into the marketing system 100 by the agent either at registration or any other time. The homeowner's personal information is entered via the homeowner/buyer/seller module 240 when the homeowner creates an account or sometime thereafter. The communication module 204 compares the personal information about the agent with the personal information about each of the homeowners, and flags those homeowners to the agent where there is some commonality. The benefit of knowing about commonalities or overlapping interests is to create a link between the homeowner and the agent that the agent can leverage to start a conversation with the homeowner.

The communication module 204 gives the agent the ability to view and edit a name and/or address of a homeowner in the APL, or to add an additional name or address to an existing homeowner record in the APL. Through the communication module 204, the agent selects the APL and after the APL is displayed in list form, the agent scrolls to a specific homeowner in the APL or alternatively searches for the name of the homeowner by enabling the search feature and entering the name of the homeowner. Once the name is found, the agent can change the name of the homeowner in the APL, or annotate or add the updated or personalized name in the APL for that particular homeowner. Additionally, one or more names can be stored for future reference. The agent has the ability using the communication module 204 to prioritize which name is given high priority, whether the legal name, the birth name, the nickname or another name preferred by the homeowner.

Once this new or additional name in incorporated or stored in the APL, this updated, alternative, nickname or additional name can be selected when creating personalized messages, email messages, and mailing lists for communicating with the homeowner. When a homeowner's name is changed and/or added, the changed or added name will be used throughout the marketing system 100 by default wherever the homeowner's name appears, for example, in the mailing address on the front of a PMD, in the salutation in a cover letter, in the PMD itself where the homeowner's name is displayed and in the homeowner's website.

It is an important part of personalizing the communication with a homeowner by using the name the homeowner wants to use. For example, the agent may know a homeowner personally and know "Thomas" as "Tommy" or "Kathleen" as "Khat". By changing the legal name of the homeowner (that most likely appears on official documents recorded by the county or otherwise), the marketing system 100 gives a personal touch to how the agent interacts with a homeowner. Personalization of the names of the homeowners in a mass mailing is one of the advantages of the marketing system 100 and provides agents with a more personalized mass mailing than the average generic or junk mailing.

The communication module 204 helps the agent create, update and maintain a blog so that the agent has the ability to write their own market commentary as often as they want. The agent can select similar to "create blog" from a drop-down menu (or some other menu feature), where a blog is created that is linked to the agent's website or some other website. The agent can then create a posting comprised of text, photographs and/or movies, and post such text, photographs and/or videos to the blog for others to see. Via the scheduling module 210 (described below), a reminder can be set up where at a particular interval, say two weeks, the agent is reminded to make a new posting to their blog.

Precision Market Document (PMD) Creation Module 206

The PMD creation module 206 is mainly responsible for providing the real estate agent a variety of tools to create a custom-tailored PMD (precision market document) that will be mailed to all homeowners in the APL, individually tagged homeowners in the APL, and/or a certain group of tagged homeowners. The PMD can be, for instance and without limitation, a brochure (e.g., a full-color multiple page brochure), a postcard, a newsletter, a pamphlet or any other type of document. For each PMD, the size, shape, content, and number of pages can be customized by a real estate agent. Each PMD created by the real estate agent can be separately saved and edited.

The PMD creation module 206 can include a variety of different, preselected templates having predetermined shapes and sizes, for example, from regular-sized or jumbo-sized postcards, to single or multiple paged brochures and newsletters.

The real estate agent begins the process by selecting the shape, size and number of pages of the PMD to be printed and mailed (or emailed). The PMD creation module 206 displays on the screen the total cost of the mailing for the PMD selected and the number of households or properties receiving the PMD. This cost estimator is important for the real estate agent to know how much the mass mailing the PMD will cost when a PMD is physically printed and mailed.

After the shape and size of the PMD is chosen, the PMD creation module 206 adds information about the agent into a banner portion of the PMD. The PMD creation module 206 may use the information about the agent which may have been entered into the real estate agent's account when the account was first created. The banner portion may be at the top of the PMD, at the bottom, both at the top and bottom, or some other area selected by the agent. The banner portion may include the photograph of the agent, the agent's realty company, the agent's phone number and address, etc. The PMD creation module 206 gives the agent flexibility over the overall size, placement, font styles, and background colors of the banner information and photographs. The PMD creation module 206 also gives options on what information is displayed and how it is displayed in the banner.

When selected by the real estate agent, the PMD creation module 206 can insert into the banner a promotional message such as for example, "Bob's NEW LISTING!", "Karen's JUST SOLD" or "Open House! Sat July 15th from 1-4 PM", etc. This message can be customized by the agent or selected from a drop-down list of commonly used phrases used in the real estate industry.

The PMD creation module 206 allows the agent to select different types of information and insert the selected information into the PMD. This information may be pre-packaged in a template form or may be generated by the PMD creation module 206. Such information may include all the agent's listings, an individual listing of the agents (whether current or past), and/or real estate market data, trends, and graphs. The agent can drag-and-drop such information from pre-packaged templates into the PMD. The agent has the ability to move information around on the PMD, resize the information, and change the graphical look of the information. Each PMD can be saved into it uniquely named file.

The agent uses the PMD creation module 206 to create and customize each of the PMD's. Each real estate agent also can create a unique PMD using pre-packaged market analytics including assorted tables, graphs, charts, tables, diagrams, spreadsheet or any other representational package of information. These market analytics are customized and selected based on an area or areas selected by the agent. These tables and diagrams can also use colorful arrows to indicate and emphasize important information. Some of the market analytics can be customized as to size, color, shape and geographical area(s) covered. Moreover, the PMD creation module 206 can generate a short message about what the table, chart, graph, diagram, spreadsheet, etc. is showing, or alternatively, the agent can add a message that is associated with the data.

Each PMD that is created, printed and mailed may be totally unique to each homeowner. Each PMD can be individually tailored or customized for each homeowner. The agent can customize a PMD to include any of the following, by way of example, a personal note to the homeowner, the address of the homeowner's property or mailing address, the homeowner's name, a market analysis of the homeowner's property based on where the homeowner resides (e.g., based on current neighborhood market and pricing trends), property photos, graphs, data tables, large market trend indicators and overviews of the city and neighborhood of the homeowner's property. The PMD is also customized to each agent, the agent's photo, logo, custom tag line, special license designation the agent may have earned, and license number.

The PMD creation module 206 provides an autosave feature that allows agents to come and go in and out of the marketing system 100 to create and revise their custom PMD's on their own schedule. If the real estate agent is not good at creating a PMD or requires assistance in creating a PMD, the real estate agent can select from a variety of templates to help the real estate agent create the PMD. The agent first selects one of the many templates that will be used for a particular PMD. For example, there may be ten different templates for a 4×6 postcard. One template may feature information about the agent, a new property listing that is being sold by the agent and the next open house, while a different template may feature information about the agent and the company associated with the agent. The agent can select from one of these templates and the information that is associated with a particular template is populated by the PMD creation module 206. If the agent does not like the look or feel of the PMD, the information can be changed by the real estate agent using the conventional means to do so, such as resizing, changing colors, or moving information around the PMD. By using a template, the PMD creation module 206 generates all or most of the PMD content without any agent intervention. Once the PMD has been created, the agent can approve and save the PMD into a separately named file.

Besides providing homeowners with a sophisticated and highly engineered overview of their local real estate market, the PMD creation module 206 gives the agent the option to arrange their listings, including the ability to add respective property photos into any print order they so choose and/or to block any of their listings from printing (via the block features of the tagging module 202). This block feature allows the agent to pick and choose which of their listings they want (or don't want) to promote.

In addition to being customized to the agent's information, each PMD includes a separate homeowner's name, the address of the homeowner's property, an optional personal note created by the agent using the communication module 204 and a proprietary blend of carefully selected analytics of the homeowner's current local market conditions, trends and the agent's market editorials as selected and inserted into the PMD. The PMD creation module 206 gives the agent the unique ability to convert and condense multiple market data points into the PMD from the agent's own interpretation.

Using the PMD creation module 206, the agent can select from predetermined templates where one or more tables, charts, graphs or reports are generated about current market conditions or other real estate conditions or trends; for example, the PMD creation module 206 can be configured to capture select market data points from the MLS and convert this raw data into easy to understand tables and graphs. These predetermined templates are useful in getting information about the real estate market to the targeted homeowners. The agent can select the report to be generated, and the enter the information required by the report, such as, but not limited to, whether the report will show a trend or market condition for a particular neighborhood, city, zip code, state, or nationally, and by date or range of dates. For example, the agent can select a template of a graph that shows the market conditions for the last three years for a particular neighborhood associated with the APL. The PMD creation module 206 will access its own database to see if the template has already been previously created. If it was previously created, the report can be displayed on the screen to the agent and inserted into the location in the PMD desired by the agent, or one that had been preselected for this PMD. If not, the PMD creation module 206 will access external or internal databases for the raw data needed for the table, chart, graph or report, will then compile the data in the required format, and thereafter will generate and display the data in the format required by the report. As with other parts of the PMD, the agent can resize and position the generated table, chart, graph or report, and can use different colors, fonts and styles for the table, chart, graph or report once it has been generated by the PMD creation module 206.

Once the table, chart, graph or report has been generated, the agent may also have the ability to write a comment or one or more sentences that will be displayed alongside the table, chart, graph or report. If available, the agent selects the website function that allows the agent to add the comment or sentence(s) to the table, graph, chart or table, and when prompted, the agent enters the comment and/or sentence(s). As with other parts of the PMD, the agent can resize and position the added comments to the table, chart, graph or report, and can use different colors, fonts and styles for the table, chart, graph or report once it has been generated by the PMD creation module 206.

Using the PMD creation module 206, the agent can save each PMD that is created. Moreover, once one or more PMD's have been created, the agent can create a different PMD by selecting that the new PMD would be populated with the information contained from another PMD. This gives the agent flexibility in creating new PMD's without the need to recreate the information as it appears in other previously created PMD's.

As mentioned heretofore, the PMD creation module 206 can also interpret raw data and convert the interpretation of such raw data into easy to understand comments. The agent selects the table, chart, graph or report to be generated and also selects the function in which the PMD creation module 206 will generate a comment (which may be one or more sentences) that will be displayed alongside the table, chart, graph or report. Once the PMD creation module 206 generates the table, chart, graph, diagram, spreadsheet and/or report and the accompanying comment(s), the agent can review the comments and save them, or the agent can edit the comments to the agent's liking. The PMD creation module 206 provides the agent the ability to either accept the table, chart, graph or report and the generated comments, or the agent can edit and input their own words. This gives the agent total flexibility in how they want to present or interpret a particular piece of information.

In summary, the PMD creation module 206 can be used to create a highly customizable listing presentation package that a real estate agent tailors for a prospective client or a homeowner. When a real estate agent is asked by a prospective client to meet directly to interview and preview their property, the PMD creation module 206 provides agents with the ability to create a presentation package that comprises a printed presentation that can include a customized comparative market analysis (CMA), an agent biography, an overview of (agent-selected) properties that the agent has sold and key market statistics that relate to the neighborhood and city of the homeowner's property. Furthermore, a custom version of the homeowner's website can be created by the agent using the homeowner/buyer/seller module 240 that can be accessed exclusively by the agent (while at the face-to-face listing presentation) that provides the CMA in a full-color digital format. The presentation package and CMA can be customized by the agent using different pre-set templates that can be selected by the agent and populated by the PMD creation module 206.

Mailing Module 208

The mailing module 208 is mainly responsible for assisting the real estate agent with the ability to match all or a tagged group of homeowners with a specific PMD; for updating and displaying the total number of PMD mailings that are scheduled to go out and the total number of PMD mailings that have been sent; for displaying the total printing and mailing charges for a particular mailing; and for displaying the total number of mailings that have been made and the total amount of the charges for all mailings, including the total print and mailing charges.

Using mailing module 208, the real estate agent selects a specific PMD from previously saved PMD's. Alternatively, the agent can create a new PMD using the PMD creation module 206. Once the PMD has been selected or created, the real estate agent then selects all the homeowners in the APL, one or more tagged groups, or an individual homeowner in the APL. The homeowners selected by the agent are those individuals who will receive the PMD (for example via mail and/or email). If a specific tagged group of homeowners has not been created yet, the mailing module 208 will interface with the tagging module 202 so the real estate agent can create a tagged group of homeowners that will receive the PMD. If there is a personal message for the tagged group or an individual in the tagged group or APL, that message already is included in the information associated with an individual, tagged group or all the homeowners in the APL (as created by agent using the communication module 204). The real estate agent can save the selected PMD and the select group homeowners into a mailing list. Each of the mailing lists can be individually saved, separately named, and can be edited at some future time. Alternatively, the real estate agent can select a tagged group and then a PMD. This flexibility gives the real estate agent the ability to create a mailing list in whatever order the real estate agent choses.

Once one or more mailing lists have been created, the real estate agent can use the scheduling module 210 discussed below to schedule a day and time for the PMD (that may or may not include personal notes for certain homeowners).

Scheduling Module 210

The scheduling module 210 is mainly responsible for: (i) scheduling a day and time when a mailing list (comprised of a PMD directed to a tagged or other group of homeowners) is sent to the printers and then mailed to homeowners designated in the tagged group; (ii) creating and scheduling reminders of events, open houses, real estate showings, appointments, postings to a blog, or other events and/or activities; (iii) creating and scheduling notices about specially created PMD's for congratulations and anniversaries; and (iv) creating a schedule for creating and sending notices to tagged homeowners about local market activities.

The scheduling module 210 brings up a screen comprised of the mailing lists, a date and a time of when a mailing will be sent to a printer, the name and address of the printer and costs of printing a specific PMD associated with the tagged group of homeowners that will receive the PMD. Each of these elements can be used to schedule a date and time when a specific mail list is sent to a specific printer, where the printer will mail the PMD to the specific homeowners. The mail list drop-down menu would be populated with the mail lists created by a real estate agent, where the mail list is selected by the real estate agent. The date and time would be comprised of a menu of the year, month, day and time. The printer drop-down menu is comprised of all the printers that are able to print the specific PMD chosen by the real estate agent. The printer can be an external or internal printer. Once a mail list has been scheduled, at the selected date and time, the PMD will be sent to the printer where the PMD will be printed and mailed to all or the tagged group of homeowners, and where the PMD created will contain special messages or notes created for a specific or group of homeowners.

Once a property is sold, a real estate agent will tag the property and/or homeowner with some indication that the property has been sold. The scheduling module 210 checks periodically (such as for example, each day, each week or every two weeks) whether there are any new sold tags. When a new property is sold, the scheduling module 210 uses a prepackaged "congratulations" PMD or a congratulations PMD created by the real estate agent, inserts the name of the homeowner into the congratulations PMD, and inserts any personal message that the agent entered for that homeowner using the communication module 204, or inserts a prewritten congratulatory note that the agent can use. The scheduling module 210 then sends the PMD to the printer where the congratulations PMD will be printed and mailed to homeowners whose properties were just sold.

Moreover, the scheduling module 210 checks periodically (such as each day, each week or every two weeks) the date associated with any sold tags, data or information. The scheduling module 210 uses a prepackaged "anniversary" PMD or an anniversary PMD created by the real estate agent, inserts the name of the homeowner into the anniversary PMD, and inserts any personal message that the agent entered for that homeowner using the communication module 204. At the appropriate time, the scheduling module 201 then sends the anniversary PMD to the printer where the anniversary PMD will be printed and mailed to homeowners whose properties were sold in previous years.

There may be a variety of congratulations PMD's and anniversary PMD's from which the real estate agent can choose. Using the scheduling module 210, the agent can select one of the congratulations PMD's or anniversary PMD's. These PMD's may include a custom graph for each homeowner. This custom graph displays a history of the homeowner's neighborhood market trends since they purchased their property. This gives the agent another powerful way to further personalize the PMD to each homeowner.

Since a PMD can be mailed to all homeowners or a group of homeowners in a particular neighborhood or area, the scheduling module 210 can be used to advertise an agent's upcoming open houses. The scheduling module 210 gives the agent a highly efficient and cost effective way to invite all or some of the local homeowners to the open house. The real estate agent can create an open house PMD which will be mailed directly to all or some of the homeowners on a consistently scheduled basis. The scheduling module 210 can be set up where a message (text, email, voicemail) is sent to the agent about scheduling an open house dates by a certain deadline. For example, the deadline can be two or three weeks before the open house. By prompting the agent, the agent can be sure the open house invitations will be sent and delivered in time for the next open house.

The scheduling module 210 can provide a list or table comprised of the date and time of the upcoming open houses and the location. The real estate agent enters the information about the date and location of each open house and saves this information. The real estate agent can choose whether to have the scheduling module 210 create the open house PMD, or to create and customize a real estate agent's own open house PMD. The scheduling module 210 (in conjunction with the tagging module 202, the communication module 204, and the PMD creation module 206) captures an agent's upcoming open house dates and times and inserts these dates and times into the open house PMD that is being mailed at a future date. If any open houses are scheduled too close to the print date of the PMD, the scheduling module 210 auto blocks these from printing and notifies the agent. The scheduling module 210 prompts an agent by sending a message (via email, text and/or voicemail) giving the agent advance notice about an upcoming deadline, for example, a deadline for sending out an open house PMD associated with a particular open house, or a notice about a posting to the agent's blog. By using the communication module 204, the agent can attach or send a personal or global note to other homeowners inviting them personally to the scheduled open house.

The scheduling module 210 (in conjunction with the tagging module 202) can also match the agent's open houses with neighbors in a certain geographical region or area, and thereby schedule a time when these neighbors should be notified about the open house. The tagging module 202 determines the address of the open house and then locates the neighborhood's closest residents from the APL, for example, the tagging module 202 flags all the homeowners that live within two square blocks of the scheduled open house. Once the tagging module 202 matches all the surrounding neighbors to the open house, it tags those neighbors and suggests that the agent send a personal note to these neighbors (using the communication module 204). The agent can simply and quickly (e.g., with a one click "yes" or "accept" when prompted) send a personal open house PMD to the tagged neighbors.

Once the agent's clients have been downloaded and tagged as a buyer or seller (using the tagging module 202), the scheduling module 210 initiates an automated or semi-automated marketing campaign to each buyer and seller. The agent can use the scheduling module 210 to create a schedule by which all new listings, price changes or status changes of homes in the areas are sent to certain tagged homeowners or those homeowners who have expressed interest in seeing local real estate market conditions. The scheduling module 210 sends these property update emails to the agent's homeowners according to a schedule selected by the agent (e.g., once a week, every other week, once a month) with an additional up-to-date market analysis PMD. All or some of the agent's clients will receive emails and/or text messages with all new homes that are newly listed for sale, those homes on the market where the price has changed, those homes that are in escrow, those homes that have sold, expired listings, canceled listings, or other status changes or are manually selected by the agent to provide to the homeowners.

Using the scheduling module 210, the agent (i) selects what document, article and/or update will be sent; (ii) the group of tagged homeowners that will receive the update; and (iii) the frequency of the notifications whether daily, weekly monthly or any other periodic time; and (iv) delivery via text, email or some other third party application. For example, the scheduling module 210 could be programmed to send the local real estate market activity every Saturday to a group of homeowners who have properties listed with this particular agent. Using the scheduling module 210, the agent obtains a particular PMD that was created automatically or manually via the PMD creation module 206.

A PMD can be tailored by the agent (using the PMD creation module 206) to create a report showing one or more of the following: houses that are newly for sale in a particular area, houses that have been put in escrow, houses where there is a price reduction, houses that have sold, houses where the listing has expired due to a non-sale, etc. If an agent is having a difficult time getting a homeowner to reduce the price of the house, the agent can create a PMD (using the PMD creation module 206) where it only shows houses where there had been a reduction in the price of a house, and the time period from when the house went into escrow after such price reduction. The agent would tag those homeowners who have not had the price of their homes reduced, and send this PMD to the selected tagged homeowners every other week. The agent can attach a personal note (using the communication module 204) to the PMD to nudge the reluctant homeowner into understanding how a price reduction may help a property sell faster. The agent has the ability to create PMD or reports that address specific circumstances of the homeowners, such as getting the homeowner to reduce the price of their house.

In one example, the PMD would include the local market conditions for a select area. When the particular PMD is selected, the selected PMD would be updated against the MLS information to determine which houses are just listed, were put into escrow, just sold, etc. The PMD creation module 206 would then update the selected PMD to show this new or updated real estate information, and may be programmed to highlight specific properties where there have been noticeable changes or those neighborhoods where the agent has listings or houses for sale. The scheduling module 210 takes the newly updated PMD and sends it to the tagged homeowners (as selected by the agent) according to the frequency (as selected by the agent). The agent can custom tailor these specialized PMD market summaries (using the PMD creation module 206) as to which homeowner they want these market PMD updates to be sent, the frequency of the delivery of the PMD, and the manner of delivery (e.g., email, text, homeowners website, blog, etc.).

These market analysis PMD helps increase the reputation of the agent as a proactive, neighborhood expert. Alternatively, the agent can use the scheduling module 210 to activate a particular PMD so that the agent can get the latest information on market movement every day. Instead of providing the PMD with updated market activity to a group of tagged homeowners, the PMD can be directed solely to the agent. This provides up-to-the-minute market analyses that can be tapped into on a moment's notice. For example, a particular PMD can be updated while the agent is on the phone with a homeowner, and then such information can be sent or provided to the homeowner. By having all the key real estate market data available via the updated PMD, the marketing system 100 provides a powerful competitive advantage for agents so that they are knowledgeable about daily or current real estate market activity in one or more areas. If the agent so chooses, a PMD with the latest real estate market activity can be scheduled to be delivered to the agent on a daily basis. This provides the agent with the latest real estate market information within one or more geographic areas and helps the agent to be the well informed about current market activity in such areas.

The agent can use the scheduling module 210 to pre-screen PMD updates before they are sent to their group of tagged homeowners. This pre-screen feature can be enabled "on" or "off" by touching the on/off box for example. By turning the pre-screen feature "on", all the specialized market notifications will only be provided to the agent first, whereby the agent can "approve" or "read" the PMD before it is distributed to the group of tagged homeowners. If the PMD is not approved, it will not be distributed to the group of tagged homeowners.

The scheduling module 210 notifies an agent when important events and/or tasks are due. Such reminders can be sent to the agent by the scheduling module 210 via email, text or voicemail, or via a separate application chosen by the agent (such as for example, a message to the Facebook account). Using the scheduling module 210, the agent enters the information about the scheduling notice, including for example, the type of notice, the urgency of the notice (e.g, "urgent", "important", "normal"), the initial date of when the first notice will be sent (as selected from a calendar), the interval of future notices (e.g., 1 week, 1 month, 6 months), and the list of where the notices will be sent (e.g., the agent's email, text; an assistant's email or text). These schedules of any notice can be stored, changed and deleted by the agent.

Property Rating Module 230

The property rating module 230 is mainly responsible for helping an agent rate a property and/or different areas of a property and allowing other users to view the ratings. Similarly to the other modules described herein, the property rating module 230 can be accessed through the website or on an application on a device. The agent can use the property rating module 230 while previewing or physically walking through a property that is on the market (or may be on the market) and give a rating to the property as a whole, different areas of the property, structures on the property, and different areas inside the structures. The rating can be any rating system used now or in the future; for instance, the rating can include a star rating system representing the best (5 stars) to the worst (1 star).

The property rating module 230 begins by the agent selecting the property to be rated. By using the property address or some other unique identifier for the property, the property rating module 230 accesses the MLS, real estate websites and/or other database(s), and downloads the photographs and/or videos of the property. Alternatively, this information is downloaded when the agent creates the APL using the APL selection module 200, and the property rating module 230 uses the information downloaded at a previous time. The agent can rate the property (as shown in the photographs) using the star rating system or any other rating system provided by the property rating module 230. If the photograph or video does not exist for a particular area of the property, the agent can take a photograph and/or video (e.g., using a camera, table, or smartphone) and insert the photograph or video into the website or application.

Alternatively, the property rating module 230 can provide a list or table of the property, the different structures on the property and the different areas within the property. For example, a rating may be entered for the property as a whole, for any structure on the property including a house, separate garage, pool, shed, barn, etc., and for the different areas in the house such as the entryway, living room, dining room, kitchen, family room, den, each bedroom, each bathroom, etc.

The property rating module 230 may be accessed by an agent, a homeowner or a prospective buyer by using, for example, a wireless connection from their smartphone, tablet or other electronic device. In this embodiment, the agent or prospective buyer can access the property rating module 230 while physically viewing a property. When going through the property, the agent views the photographs or list associated with the property. If there are no photographs for a specific property, the agent can create photographs for different areas. For example, when the agent is in the kitchen, the agent can take a photograph of the kitchen, add the photograph to the property listing, and then rate it. The agent can also leave any comments about the kitchen, and also take additional photographs of different areas of the kitchen. These comments and photographs are associated with or tagged to the specific area of the property that the agent is viewing. The photographs and comments can be stored into a file and separately named.

The overall rating for a property can be a combination of the ratings for each of the different areas of the property. The ratings can be stored, edited and individually named. The agent can leave any comments, notes or messages associated with the overall rating or individual ratings so that the agent can keep track of issues involving the property, such as for example, outdated kitchen, outdated wallpaper, old appliances, old carpet, etc.

The agent can edit any photographs or comments and save them into one or more different files. This editing allows the agent to clean up or enhance any on-the-go comments and photographs the agent is inputting during a property tour. This edited file of cleaned up or a final rating of the property then gives the agent the ability to instantly respond back to a homeowner or prospective buyer, while still preserving the original file for the agent's own use.

The agent has the ability to approve an edited version of a property rating for limited release to a homeowner or prospective buyers by creating a list of people who can view the agent's property rating. The selection of who can view an agent's rating of a particular property is accomplished via check boxes, lists, email addresses, agent names, or any other way known in the art. Once edited and approved by the agent, each property rating is accessible via the homeowner/buyer/seller module 240 or some other part of this system or a different website.

A homeowner or buyer is given access to each property that the agent rated, where the homeowner or buyer can view the comments, questions, photographs and/or videos of the agent. By tagging each property the agent has personally previewed and rated, the homeowner and prospective buyer or seller can see what houses the agent has reviewed. This helps to form a perception that the agent is well informed and knowledgeable of the housing market, and would be a good agent for selling the homeowner's property or help a buyer find a property to buy.

Each property rating must be approved by the agent before it becomes accessible on the homeowner's website (or some other site). When the agent's property rating updates the homeowner's website, it is tagged on the site indicating the agent has previewed a property. These preview tags allow the homeowners to ask the agent questions about a property knowing that the agent has personally toured and commented on the property. All the ratings, comments and photos the agent inputs into the app are saved in the cloud and/or within the marketing system 100 (FIG. 1), and easily accessible for future reference.

Moreover, the agent doesn't have to rely on his/her memory as the system pulls homeowner's questions on a specific property and matches it up with the agent's rating and comments. This gives the agent the ability to instantly respond to the homeowner's questions. Alternatively, the agent can further customize his response by combining new personal comments and combine it with the existing property rating or ratings.

Using the property rating module 230, a real estate agent may send a prospective buyer with a list of properties that are to be rated by the homeowner. If available, each of the properties will have a set of photographs or videos. Similar to the agent, the buyer can view each set of photographs and/or videos of a property, and rate each part of a particular piece of property. Once the ratings of one or more properties have been completed, the homeowner/buyer/seller can save the property ratings and give electronic permission to the real estate agent to view their ratings of each property within the list, such as by clicking on a setting that makes one or more properties' ratings to be viewable by a list of people, group of people or particular people. The real estate agent can view the ratings given by the homeowner/buyer/seller for each property. This tool is useful for a real estate agent to understand what features or characteristics of a property would appeal to a prospective buyer, whereby the real estate agent can use this information to search for a property more suitable for the prospective buyer.

When the agent previews and rates a property that matches the search criteria of a potential buyer, the property rating module notifies the scheduling module 210 to schedule a periodic (e.g., weekly) eblast to all qualifying buyers and sellers. According to the scheduled time, the property rating module 230 will prompt and/or present these ratings to the agent giving the agent the ability to select any (or all) clients that should receive the ratings via email. This provides another powerful marketing tool that touches an agent's past, current and prospective clients on a regular and personal level.

Alternatively, the property rating module 230 may reside on an agent's tablet or smartphone or other electronic device. Using the property rating module 230, the agent can add an event to the agent's Google, Outlook or other electronic calendar whereby an email and text is sent to the agent about the event at the designated scheduled time. The property rating module 230 displays a list of properties that are on tour that day (e.g., Monterey and Pacific Grove have brokers tour on Wednesday each week, while Carmel Valley and Carmel Highlands have brokers tour on Thursdays). When the agent signs onto the website or application, the agent can click on any of the homes that are on tour that day. The property rating module 230 remembers the homes the agent has already toured and flags these and moves them down to the bottom of the list, so the agent does not have to revisit properties that have already been rated.

Once the property is opened within the property rating module 230, the agent is guided through the inside of the house room by room starting with the front entrance of the home or can go through the inside of the house whatever way the agent prefers. The property rating module 230 allows the agent to rate each room using a rating system. The agent also can voice record or type in any additional input/personal remarks they want to add to their rating of a specific room or the entire house/property in general.

The ratings for each property are uploaded where the agent can add, change or delete any ratings taken during the tour.

Homeowner/Buyer/Seller Module 240

The homeowner/buyer/seller module 240 is primarily responsible for creating a website for each homeowner, buyer and/or seller in an agent's APL or as otherwise desired by the agent, and to view all communications the homeowner, buyer or seller has had with the agent through their website. A homeowner, buyer or seller can be individually invited to visit their website using their homeowner, buyer or seller electronic device 110a by way of an invitation printed on a PMD to that homeowner, buyer or seller (hereinafter also referred to as subject). There is a separate and unique website address or URL for each subject, and the subject is given a unique agent name and password to access their website. On this website, a homeowner, buyer or seller can communicate directly with the agent via text, email or phone. Each website is protected by a password. A homeowner, buyer or seller can visit their website where they have access to many tools to analyze their local real estate market. The homeowner, buyer or seller has the option to click on any property on the website, ask the real estate agent questions on that property or the market in general. The real estate agent receives a message (e.g., via text, email, phone or other application) from that subject, where the message may include photographs and details about the specific property that the subject is asking about.

Alternatively, the PMD sent to homeowners, buyers or sellers may generally invite all these subjects to a particular URL or website address, where the subject registers for the website and/or application, and thereafter provides the website with specific information including an email address. Upon confirmation, the subject is taken to a website created for that homeowner, buyer or seller.

Using the homeowner/buyer/seller module 240, a real estate agent selects the layout of the homeowner, buyer or seller's websites from a variety of pre-set templates or creates a template of the layout and information to be used for each of the homeowner, buyer or seller websites. These pre-set templates vary as to the information created for the homeowner, buyer or seller. The homeowner/buyer/seller module 240 creates a website based on the selected template for each property or homeowner, buyer or seller in the APL, including, for example, the subject's name(s), property address and property photographs (e.g., taken from the last time it was on the market, or as personally taken by the agent). The homeowner, buyer or seller's website is also branded to each agent including information about the agent, such as the agent's name, photo, logo, license number and the brokerage's logo. Each website provides homeowners, buyers or sellers with a multitude of tools the agent can use to research their local market, their city, or other local cities and areas. These tools can vary as to tables, charts, graphs, reports, links, background information and credentials of the real estate agent and/or real estate agent's company, current home price, etc.

Each of the homeowner, buyer and seller's websites are tailored and customized specifically to each homeowner and branded specifically to the licensed agent and is protected from anyone except an authorized homeowner from signing in or accessing the website. All settings and searches made by the homeowner, buyer or seller are saved by the homeowner/buyer/seller module 240 for the subject's or agent's future use. The homeowner, buyer or seller's websites are tied directly into the PMD that is mailed to the homeowners, buyers or sellers, and are designed to complement and work cohesively with the PMD on multiple levels.

These custom homeowner, buyer or seller websites also allow the homeowner, buyer or seller to communicate directly with the agent. This feature is especially powerful because the subject can ask or comment on any property that is currently on the market without having to leave their homeowner, buyer or seller website; for example, the subject may simply select a "questions" button, or the like, alongside each property. The "questions" button can open a pop-up dialogue box in which the subject can type their questions and/or comments about any property they are looking at on the website. The subject's questions or comments are sent to the agent (e.g., via email, text, voicemail, or any other application) along with the property details. The agent can receive these messages on any of the devices set-up by the real estate agent to manage the subjects' questions. The homeowner/buyer/seller module 240 gives the agent the ability to respond back and to include any data the agent may want to provide, including property rating information.

The homeowner/buyer/seller module 240 can also display all or some of the homeowner, buyer or seller's activity on their website, such as, but not limited to, the number of visits the subject made to their website, what links or pages on their website the subject has clicked on most, and the amount of time they have spent on each link or page. The homeowner/buyer/seller module 240 may also flag or tag those subjects that have used their respective website the most so an agent can identify which subjects to communicate via the communication module 204.

The homeowner/buyer/seller module 240 may also monitor the use of the websites by homeowners, buyers or sellers, save this information, and compile the information into analytics and web traffic statistics. For example, the homeowner/buyer/seller module 240 can save and display the history of each subject's website visits, the number of pages or links each subject clicked on, and the dates they signed on each time. The subjects that have visited their website the most times can be moved to the top of the list by the homeowner/buyer/seller module 240 so the agent can see which subjects are the most active agents of their respective homeowner, buyer or seller website. By knowing the homeowners, buyers or sellers that use their respective website the most and by also knowing the homeowners, buyers or sellers that use their website the least, the agent can take multiple actions, such as sending personal notes to these subjects, reminding them that there is a wealth of information awaiting them if they take a moment to check out their respective websites, and an unlimited variation of other personal reminders. By tracking the number of visits that the homeowners, buyers or sellers use their respective website, the agent can use this information in multiple ways, such as, but not limited to: 1) knowing which pages or links on the homeowner, buyer or seller websites are most visited, thereby giving the agent knowledge as to which pages are most used and which pages might need to be taken off the homeowner websites due to lack of use; 2) knowing which subjects are most active on their websites, based on which the agent can send those subjects personal notes in one or more documents mailed to the subjects letting them know there may be a new feature on the website that the homeowner, buyer or seller might find useful.

If the agent has a blog and adds a new post to the blog, a pop-up model for a homeowner's website will be shown after the homeowner logs in. The new blog post will appear one time for each homeowner, whereby the homeowner can click on the blog post to read it or can delete the blog posting.

If the real estate agent has created two or more new postings, the homeowner will only see the latest blog posting. The marketing system 100 allows the agent to create as many blog postings as often as they want. When a new blog posting has been created, the previous blog postings are hidden or not displayed unless the homeowner chooses to view the agent's blog history. The homeowner is also able to block future blog posts by enabling the blocking feature, such as, for example, selecting the block blog posts from a pop-up menu from a right click of the mouse.

Return on Investment (ROI) Module 250

The agent can use the return on investment ("ROI") module 250 to calculate the agent's real return on investment. The ROI module 250 may calculate the ROI based on an average of several years (e.g., the last three years) of the agent's past and current listings for a specific area, excluding sales that happened before the agent started using the marketing system 100. For example, three years ago, the agent made 2 sales; two years ago, the agent made 4 sales; and the last 12 months, the agent made 4 sales; the sales over the last three years are added together (2+4+4=10) and the resulting sum is divided by the number of years used (3) resulting in a ROI of listings per year (10/3=ROI of 3.3).

When the ROI module 250 calculates the ROI such as by the method indicated above, the ROI module 250 can then apply this calculated ROI to further calculate the agent's "Real ROI". The "Real ROI" is a number calculated per the present invention and which is intended to give the agent a deeper understanding as to what their actual ROI is after the agent begins using the marketing system 100 of the present invention.

For instance, referring back to the example above, since the agent has shown a history of having approximately 3.3 listings per year, the ROI module 250 disregards (i.e. does not count) the first 3.3 listings that agent gets after commencing use of the marketing system 100. After the agent gets 3.3 listings in the area, the ROI module 250 begins to count each listing as being attributable to the marketing system 100 and calculating the agent's "Real ROI" number.

Figure 23:
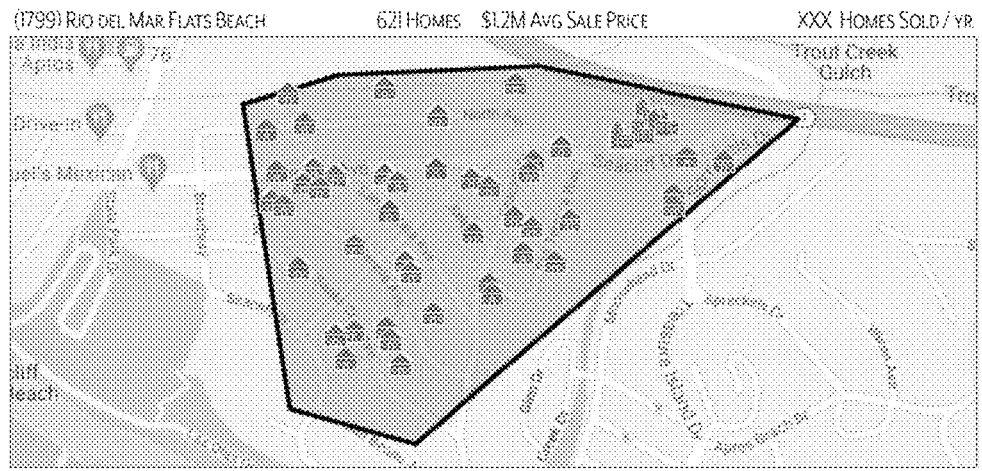
Figure 24:

The ROI module 250, in conjunction with the mailing module 208 can display the agent's "Real ROI" for the mailing list the agent is working on. This gives the agent an updated year-to-date "Real ROI" which helps them understand how effective their mailings and ongoing personalized communications are. An exemplary embodiment of a ROI printout is shown in FIGS. 23 and 24. As illustrated in the exemplary embodiment, a ROI analysis is shown on FIG. 23 illustrating an annual expense breakdown against the total net income of an average sale of a property. For example, as shown, an exemplary initial investment of about thirteen thousand per annum in expenses is detracted from the net income of an average sale by the agent. The expenses may amount to the costs per annum to mail PMD's and or have exclusivity within a particular area. As shown on FIG. 24, the average sale commissions are calculated against the initial investment to provide the agent's ROI. In one exemplary form, at least one average sale of a property can pay up to about a year and a half worth of PMD mailings and exclusivity within a specific area. Of course, the ROI may vary depending on multiple factors, such as the total net income of a property, amount of mailings per year, area exclusivity, and more as shown and described herewith, and thus, the following should be considered exemplary and not limiting.

In some embodiments, the method or methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical agent interface (GUI) or any visual element of the methods or processes described above. For example, the display subsystem, storage machine, and logic machine may be integrated such that the above method may be executed while visual elements of the disclosed system and/or method are displayed on a display screen for agent consumption. The computing system may include an input subsystem that receives agent input. The input subsystem may be configured to connect to and receive input from devices such as a mouse, keyboard or gaming controller. For example, an agent input may indicate a request that a certain task is to be executed by the computing system, such as requesting the computing system to display any of the above described information, or requesting that the agent input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described functions, features, methods or processes may be executed, provided, or implemented by one or more computing devices via a computer program product such as via an application programming interface (API).

Prediction Module 260

The prediction module 260 is primarily responsible for identifying homeowners that are more likely to sell their property in the near future and for setting up a target marketing campaign to solicit business from such homeowners. The prediction module 260 uses artificial intelligence including an array of advanced algorithms to create a prioritized list of likely future sellers of their house.

The prediction module 260 uses the homeowners listed in the agent's APL and creates a profile on each of the homeowners by gathering data points from a multitude of diverse databases, websites and information for each homeowner. This may also involve social media sites such as Facebook, Instagram and Linkedin, for example. The prediction module 260 analyzes data by taking into account such factors for example, (1) how long the homeowner (i.e., property owner) has owned their property; (2) whether the homeowner is a single or joint owner; (3) the age of the homeowners; (4) profession of each of the homeowners; (5) distance to where each of the homeowners is employed; (6) change in marital status; (7) change in number of children in the house, whether by birth or adoption; (8) number of children in the house and their age; (9) the turnover rate in the neighborhood, including the number of homes sold in a specified period of time; (10) whether anyone in the house has passed away; (11) change of ownership from present owners to owner's family, children or trust; (12) the graduation of children residing in the house from high school and/or college; (13) distance to where high school or other school that any children residing in the house attend; (14) wedding anniversaries of the homeowners, such as the fiftieth anniversary; (15) changes in and to the neighborhood including changes in zoning; and (16) changes in the traffic patterns of the roads in the neighborhood. Each of these factors are individually weighed to give more weight to those factors that indicate which homeowners may be interested in selling their property sooner rather than later.

Once a profile is created on each of the homeowners, the prediction module 260 priorities those homeowners that have been identified as more likely to sell their property, where those homeowners that have a greater likelihood of selling appear first or at the top of the list or highlighting the homeowner name with a special highlight to indicate that the homeowner may be potential seller. The prediction module 260 interacts with the tagging module 202 to automatically create a tagged potential seller list, by attaching a tag to those homeowner and/or properties more likely to sell their property.

Using the prediction module 260, the real estate agent 108 can view each of the homeowners in the tagged list of potential sellers and view any background information that may have been used to qualify each homeowner to be included in the tagged list of possible future sellers. Such background information gives the real estate agent 108 valuable insight as to why a particular homeowner would be more likely to sell their property. The real estate agent 108 can also view information about the property, including for example, photographs of the property, the homeowner's purchase anniversary date, and any and all information about the house such as square footage, number of bedrooms, bathrooms, etc. After examining the background information, the real estate agent 108 has the ability to untag or remove the tag associated with the homeowner from the tagged list of potential sellers if the real estate agent 108 determines that the homeowner is less likely to sell in the near future. The real estate agent 108 also can make new groups of tagged potential sellers, possibly grouping the potential sellers into different categories, such as those celebrating $50^{th}$ wedding anniversaries and those who are over 100 years old.

It is imperative that these potential sellers be marketed in a timely manner if the real estate agent 108 wants to get the opportunity to sell the house or property of such potential sellers. The prediction module 260 automatically creates a marketing system for targeting such potential sellers quickly and efficiently by creating and sending marketing materials to such potential sellers. The prediction module 260 creates specific PMDs by interacting with the PMD creation module 206 to create PMDs that target specific homeowners in the tagged list of potential sellers. There are a variety of different PMDs that the real estate agent 108 can choose and may include a different PMD for sending each month over a period time, like 12 months. These specialized PMDs also may have, for example, useful information for the homeowner about the best practices and proven ways and/or methods for preparing their property to be put on the market, including what feature or characteristic of a house would contribute to the highest sale price in the shortest possible sale time; best market indicators for when to know that a property should be placed on the market; pricing strategies so a property would sell quickly; and, information about the real estate agent 108 in how the real estate agent 108 has sold similar properties in the neighborhood and how long it took to sell such properties. These PMDs can combine colorful infographics and photographs specifically tailored to homeowners that are planning on selling their property.

The prediction module 260 also has special PMDs for homeowners who owned their home for a long period of time, for example forty or more years, and may show and discuss changes in the neighborhood over the forty year period of time, including adding interesting historical facts to the PMD, like for example, how many homes sold in the neighborhood when the house was bought, who was president of the United States when the property was bought, and the movie, actor and actress who won Oscars when the property was bought. These interesting facts are designed to catch the potential seller's attention and interest and helps build a friendly familiarity between the potential seller and agent.

The prediction module 260 shows the list of PMDs and gives the real estate agent 108 the ability to schedule (in interaction with the scheduling module 210) which PMD will be sent when and to which tagged potential sellers. As described above, the real estate agent 108 also can use the communication module 204 to create personal notes to each homeowner in the tagged list of potential sellers.

Optimized Market Analysis Module 270

The prediction module 270 is a tool that helps an agent prioritize what can be displayed on the PMD. Prioritizing what is displayable on the PMD in a format that is relevant and easily understood helps homeowners interpret or otherwise understand complicated, dense market data, allowing the homeowner to utilize otherwise unwieldy data to their advantage. As discussed in greater detail above, the APL extrapolates information from public or private databases having data on existing properties. The data extrapolated from the databases are analyzed and presented in a beneficial format to the homeowner. The Optimizing Market Analysis module (OMA) includes a micro-market data analyzer. A micro-market in this particular environment is understood to be a market within a market. For instance, in addition to measuring or analyzing a city and neighborhood market data within a specified region, the market system can further parse additional, specific, and targeted market data within that specified region. In one exemplary form, micro-markets may include but are not limited to gated communities, condo complexes, subdivisions, homeowner associations (HOAs), and small specialized pocket neighborhoods that fall under a larger set of market data within the specified region. Without this tool, small market data of a particular subset of homeowners are generally lost or otherwise overshadowed by the larger communities.

One will appreciate that mass marketing campaigns are impersonal and generally include irrelevant and unnecessary clutter of information that is not beneficial to the recipient. This archaic campaign-style is wasteful, and the impact felt by it requires a novel solution. The OMA offered by the marketing system, however, addresses this flaw by allowing agents to pinpoint micro-markets and display relevant information on those micro-markets to its residents. For example, by including a condo association name or subdivision name on the PMDs, the PMD is instantly recognizable and relevant to its recipient. There are occasions, however, where data is in excess and available, and at other times scarce. In the instant case were data on a particular micro-market includes a sufficient quantity of data, i.e., there are at least two transactions within a specified period, the OMA module separates the data of the micro-market from the larger market that surrounds the micro-market and allows the agent using the creation module to display the targeted information on the PMD. The PMD in this scenario is particularized to that micro-market, making the PMD's more relevant and recognizable to its recipient. In the event market data within the micro-market is scarce, i.e., there are less than two transactions, the OMA scans for the last date when there was a sale within the micro-market to display a condensed set of information on the specific region. The condensed information includes fewer details than is otherwise included and otherwise wanted on the PMD because of the limited data, but still includes enough information to inform the recipient of what is going on within their region and particular market. As such, the PMD is still relevant to the recipient, unlike mass marketing campaigns that paint the market with a broad brush.

To create PMDs that include micro-market information, the OMA identifies and separates individual properties within large groups of properties. For instance, in a condominium complex, the OMA parses each property within the condominium complex into an individual set of data that can be separated and tagged by the agent. The tagged properties may be selected or discarded manually by an agent and used to create customized PMDs that can be mailed to a selected group of recipients through the mailing module. In instances where the public or private database communicating with the market system does not include a particular property within a large set of properties, e.g., a specific condo within a condo complex, the OMA allows the agent to manually add (or remove) the property from the APL. Indeed the OMA can also allow an agent the ability to add or move homes in and out of HOAs or subdivisions—thereby increasing the accuracy of the real market conditions that are happening, which would have otherwise been missed altogether. Without the ability to add, remove, identify, tag, or otherwise recognize micro-markets, potential recipients of PMDs may notice that their particular property or a property they are aware of is missing or included in error, affecting the accuracy of the PMD and negatively affecting the confidence level of the recipient on the PMD.

In one exemplary embodiment, the creation of a PMD with the micro-market analyzer may include on the PMD an enlarged font depiction of the micro-market in question to catch the attention of the recipient upon immediate review of the PMD. Below the custom title on the PMD, the PMD may include a variety of additional information, such as the average sale prices of the property, days on the market, price reductions, and more. For example, an agent that has a license within a specific area that includes a large neighborhood called Northwest Carmel having approximately 700 homes in the area and a condo complex called Golden Oaks having 150 condos within that specific area, the agent through the use of the OMA and its micro-market analyzer can customize the PMD to include on the header of the PMD "Golden Oaks" to all recipients of the condo complex. The homeowners within Northwest Carmel, however, may receive a PMD with a customized title stating "Northwest Carmel." If for any particular reason the condo complex is not registered or readily identifiable in public or private database feeding information to the market system, the agent can, as described above, manually add the condo-complex to the APL.

When a micro-market is created by the agent, the market system now allows the agent to send just those specific homeowners their own custom global note or in this case micro global notes. The power of pinpointed mass mailing in the hands of agents gives them the ability to turn mass mailing into a highly specialized mass/micro mailing tool. By sending each homeowner in these micro-markets their own specialized global note, it makes the PMA all that much more personal and all the more relevant. And after all, one will appreciate any type of marketing piece's value is increased dramatically if the content is more relevant and more personal.

The OMA also includes what is referred to within the internal workings of the system as substitution logic. Generally, substitution logic is the system's ability to identify and separate outlier's within the data set that is analyzed in a particular area. For instance, not all neighborhoods or micro-neighborhoods have enough market activity to provide a steady and accurate data flow, or the data itself in raw form is inaccurate. For instance, some neighborhood markets can be more active, i.e., hotter, than their city region. Thus, data observed for the city is not the same as data for the neighborhood, making the data misleading if misunderstood. When this occurs, alternative systems do not account for the inconsistency and utilize inaccurate data that could confuse the recipient. The market system 100, however, parses through the data and removes data inputs that would inaccurately skew the results to maintain only useful data. The OMA does this by parsing through both city and neighborhood data within a specified region. The system compares the data being retrieved from said city and neighborhood locations and compares it to a tagged property by the agent. By doing comparative driven analysis, the OMA identifies the neighborhood and its micro-market for data that is reliable, replacing, or substituting inaccurate data with accurate representative data of the specified area.

The OMA module of the market system also includes the capability of automatically switching irrelevant and inconsistent data for reliable data. For instance, the OMA module reviews incoming data and checks whether neighborhood data is consistent with the surrounding city's data. The OMA module, in one exemplary embodiment, checks the neighborhood data points of a particular neighborhood and compares the data to the information obtained from the city market. If the neighborhood identifies the market as leaning towards a buyer's market because of the available data, the OMA checks the available data on the surrounding city of the neighborhood. If approximately ninety percent or more of the available data for the neighborhood shows the market is leaning in favor of the sellers (or vice versa), the system substitutes the neighborhood data for the city data and indicates to the recipient which data is being displayed.

For example, if a neighborhood named X had a property that has an unusual amount of days on the market figures as compared to ninety percent of the other neighborhoods in the surrounding city that had a substantially low number of home sales (or a low number of unit sales) compared to ninety percent of the other neighborhoods, then it would be logically acceptable to conclude that the neighborhood X is an outlier and not indicative of what is really going on in that particular market. In that case, the OMA switches out the neighborhood data of X and replaces it with the data shown by the city market where neighborhood X is located. Of course, the PMD will include descriptive language and markings that clarify to the recipient that the data being shown concerns the city market and not neighborhood X. As such, outlier data is omitted from the PMD, and the recipient is explained why the data was omitted.

In addition to the above, the OMA is capable of presenting data in a simple to read and understand manner. Throughout the screenshots examples provided, one will appreciate how a PMD may include data that a homeowner can understand to determine whether or not they are in a competitive advantage or disadvantage position within their own current market conditions.

The OMA, in unison with the APL, property rating module, mailing module, return on investment module, and others, work together to provide optimized, pre-calculated information that is understood by even the most inexperienced homeowner. For example, OMA generates at least six separate market data points that may be included in each PMD. The six separate market points include but may not be limited to the average sale price of properties, average days on the market, the average percentage received of asking price, high or low inventory levels of available properties, price reductions of properties, and the numbers of units sold. All six of the data points are analyzed individually and then compared to one another by the OMA to create a hierarchical list of data points based on the most favorable to the homeowner at the top followed by the less favorable.

Figure 17:
Figure 20:
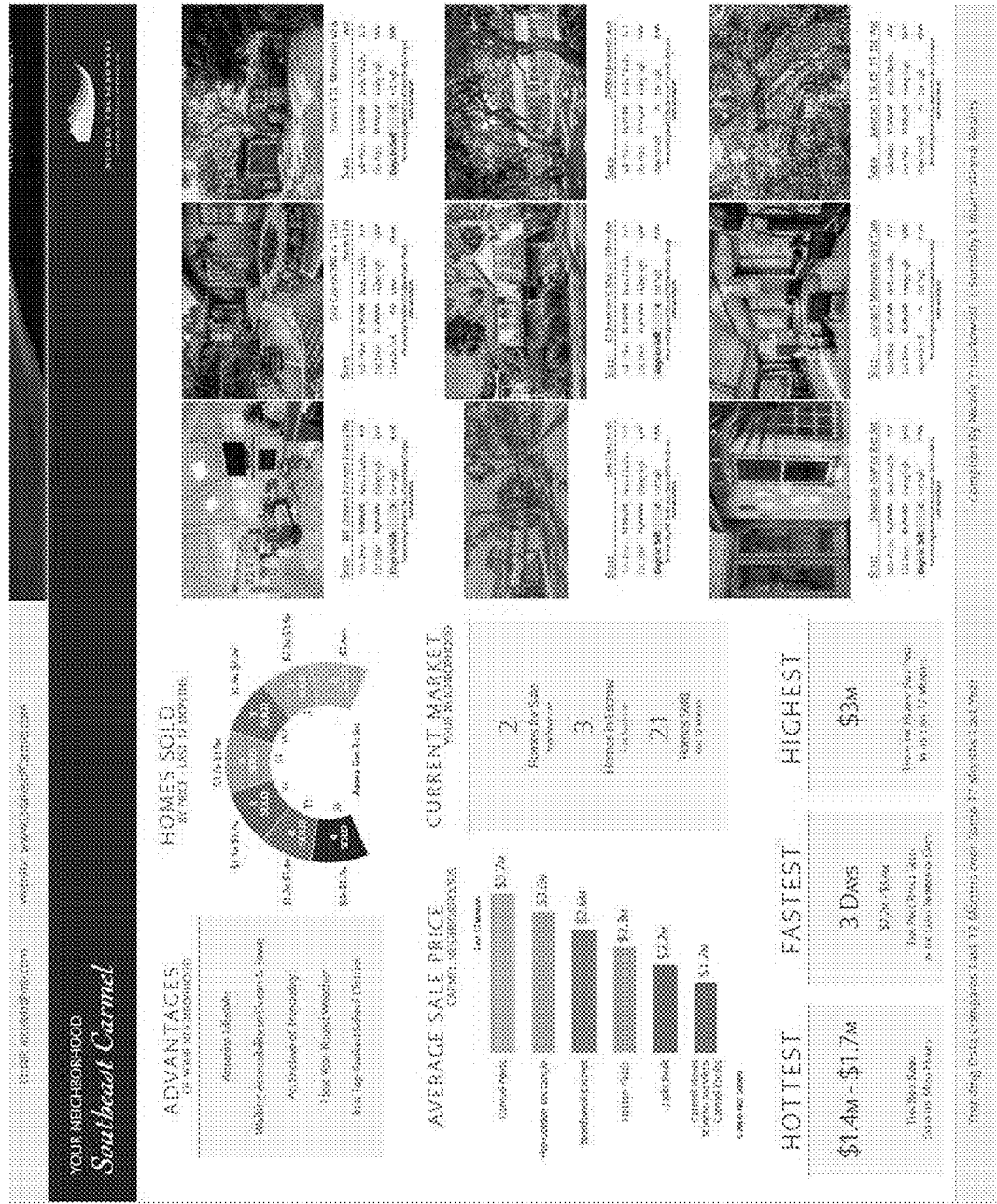

Let say, for example, the agent is reviewing a property within a particular region. The OMA sifts through the data and finds that the average sale price is up from one period to another, identifying it as a seller's advantage. The system also analyzes the average days in the area properties have been in the market. If the average day goes down from one period to the next, it identifies that data point as a seller's advantage. If the average asking price is down, it reflects that as a buyer's advantage. If there is low inventory, that is considered as a seller's advantage. The data, in this prime example, shows a property in an area that is to the seller's advantage, i.e., the homeowner. Having identified the market conditions, the system parses through all of the advantages and puts them in hierarchical order, with the most advantageous at the top. The data is then placed on the PMD that the homeowner receives. In some embodiments, because of space constraints, the PMD may only have three advantageous data points of the six data points printed thereon. In other embodiments, the data point to "average sale price of properties" is always included in the PMD, with the two other data points being the most relevant to the homeowner. An example of the aforementioned data points is offered in the accompanying screenshots, FIGS. 17 and 20.

Figure 18:
Figure 19:
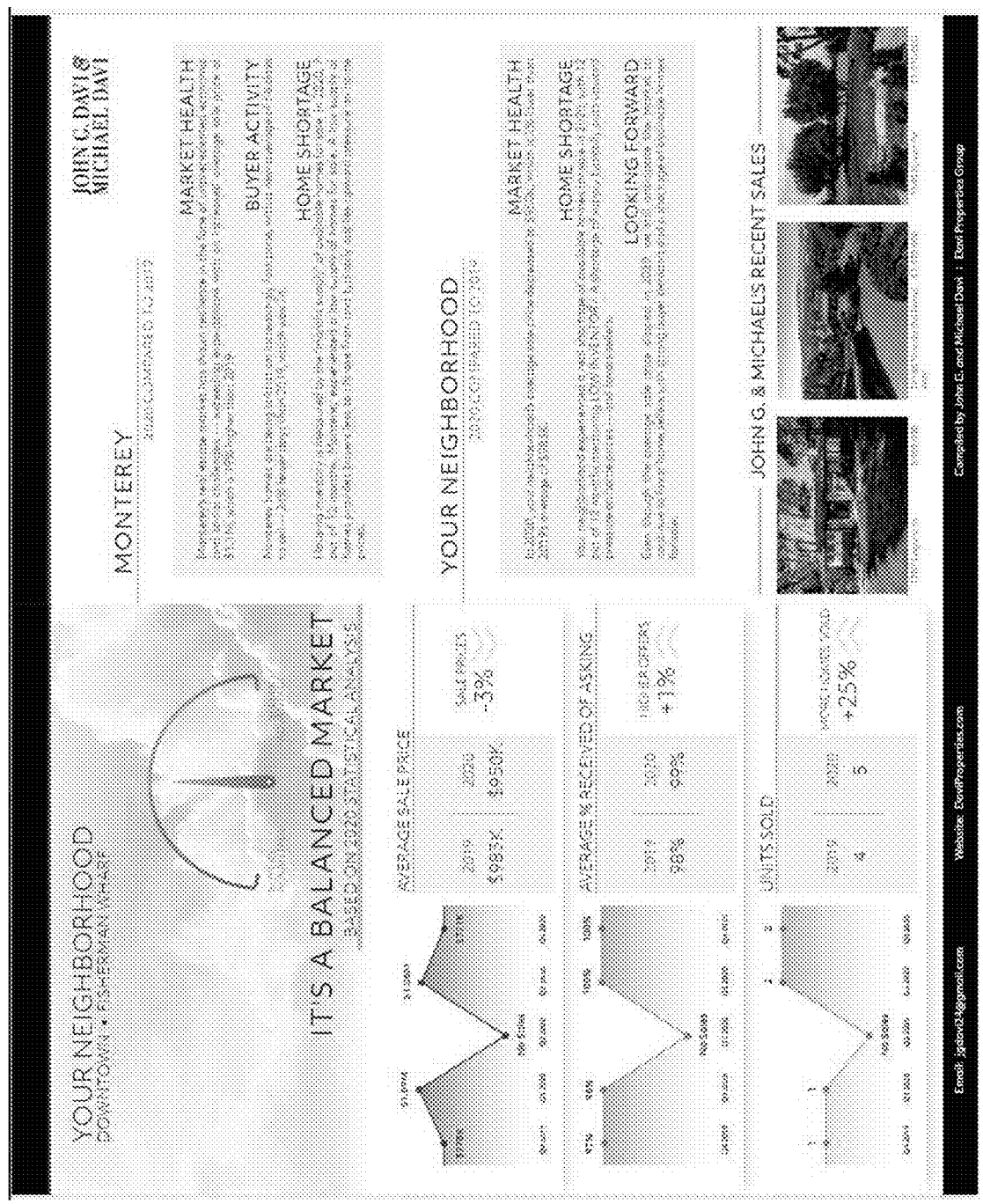

The OMA of the market system 100 also includes a market meter creation feature. The market meter is a graphical image that is displayable on the PMD that visually illustrates to the recipient of the PMD whether the market conditions favor buyers or sellers, and is seen in FIGS. 18 and 19. While alternative systems use similar graphical representations, the way the market meter presents the information and calculates the data to display the meter's position is substantially different and an industry first. For instance, the market meter is controlled by the OMA that parses through the data obtained from the public and private databases, as explained above. Each market indicator from the list of market data points provided above is assigned a weight percentage or value to it, which together adds up to one-hundred percent and is used to determine where the needle falls in the graphical depiction printed on the PMD. The position of the needle on the market meter is mathematically calculated. This is different from other imprecise methodologies currently utilized by others.

For example, in one exemplary embodiment, the formula used to calculate the position of the market needle on the market meter is as follows where the weight in percentage form. The average sale price is thirty percent, the average days on the markets make up twenty two percent, the average percent received of asking price is fifteen percent, the price reduction is fourteen percent, the inventory levels is thirteen percent, and the number of homes sold in the area is six percent, totalling one-hundred percent. The needle on the market meter will typically start in an equal or balanced position, i.e., in between a seller's market and buyer's market. Once data begins to pour in and is analyzed by the OMA of the market system, the data is considered based on the importance of it, i.e., its assigned weight, and the needle begins to move in a direction. The movement of the needle is precise and in proportion to the weight of the calculated data. The preciseness offered by the instant invention allows a recipient to have a concise visual indicator of the market's condition that is easy to understand, as seen on FIG. 18.

Screenshot Examples

The screenshots shown in the following figures are examples of the options, functions, features and characteristics of the modules of the marketing system 100. These illustrative screenshots are provided by a website stored and running in the marketing system 100 and presented to the real estate agent 108 (FIG. 1) via the screen and user interface in the real estate agent electronic device 108*a* (FIG. 1). These screenshots are examples and do not limit how these screen menu options may be displayed; instead, there are many ways to implement the options, functions, features and characteristics of the modules described herein. As used in the figures, "PMA" (precision market analysis) is equivalent to "PMD" (precision market document) as described above.

Figure 3:
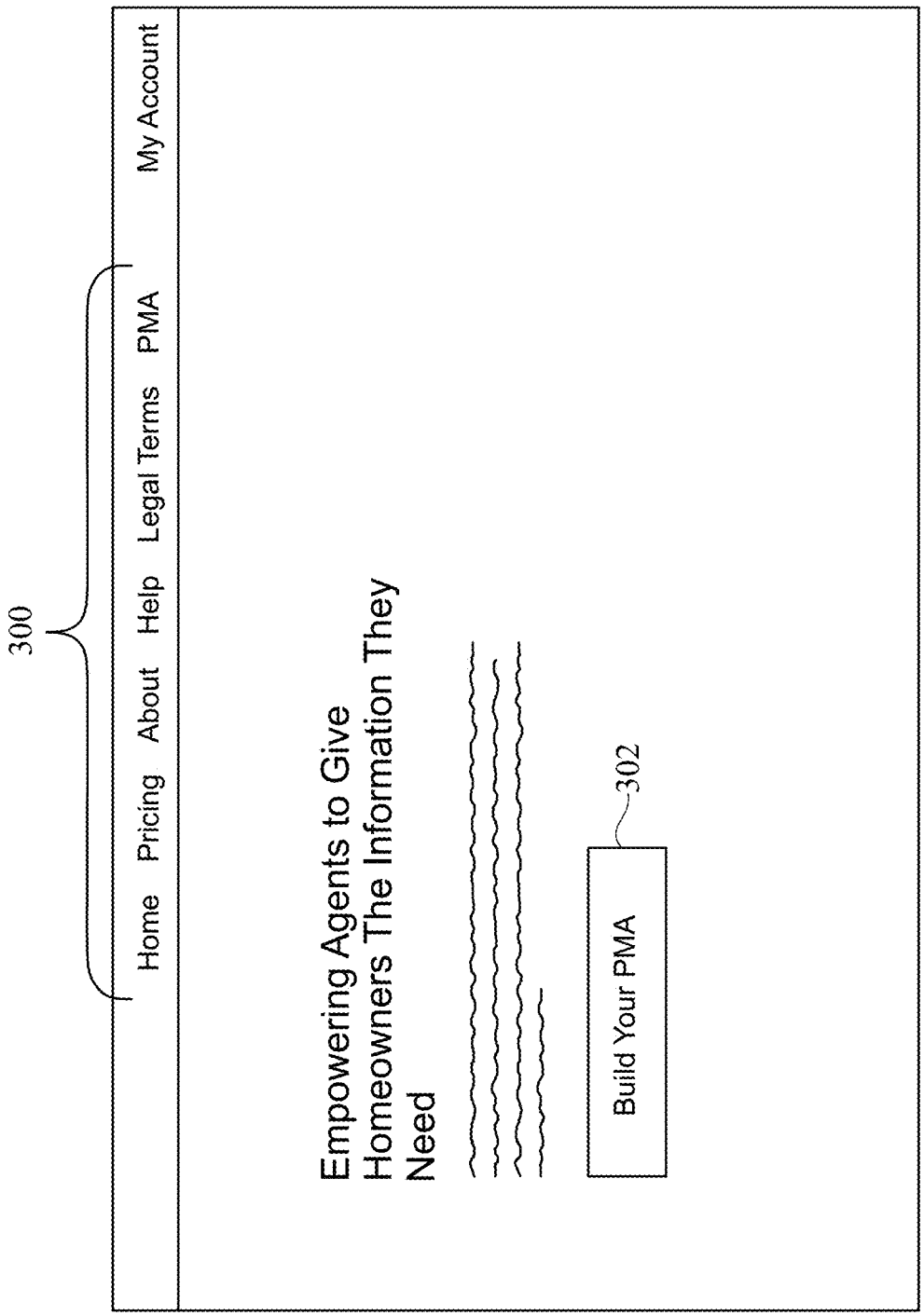
FIG. 3 presents an example of a screenshot of the marketing system.

The illustration of FIG. 3 shows an example of a screenshot where a real estate agent 108 can click on a menu option 300, including home, pricing, about, help, legal terms and "PMA". Clicking on a menu option 300 may show additional menu options. By clicking on the button "Build Your PMA" 302, the real estate agent 108 will be taken to another screenshot where a real estate agent 108 can use PMD creation module 206 to start building different PMDs either from scratch or from one of many different templates.

Figure 4:
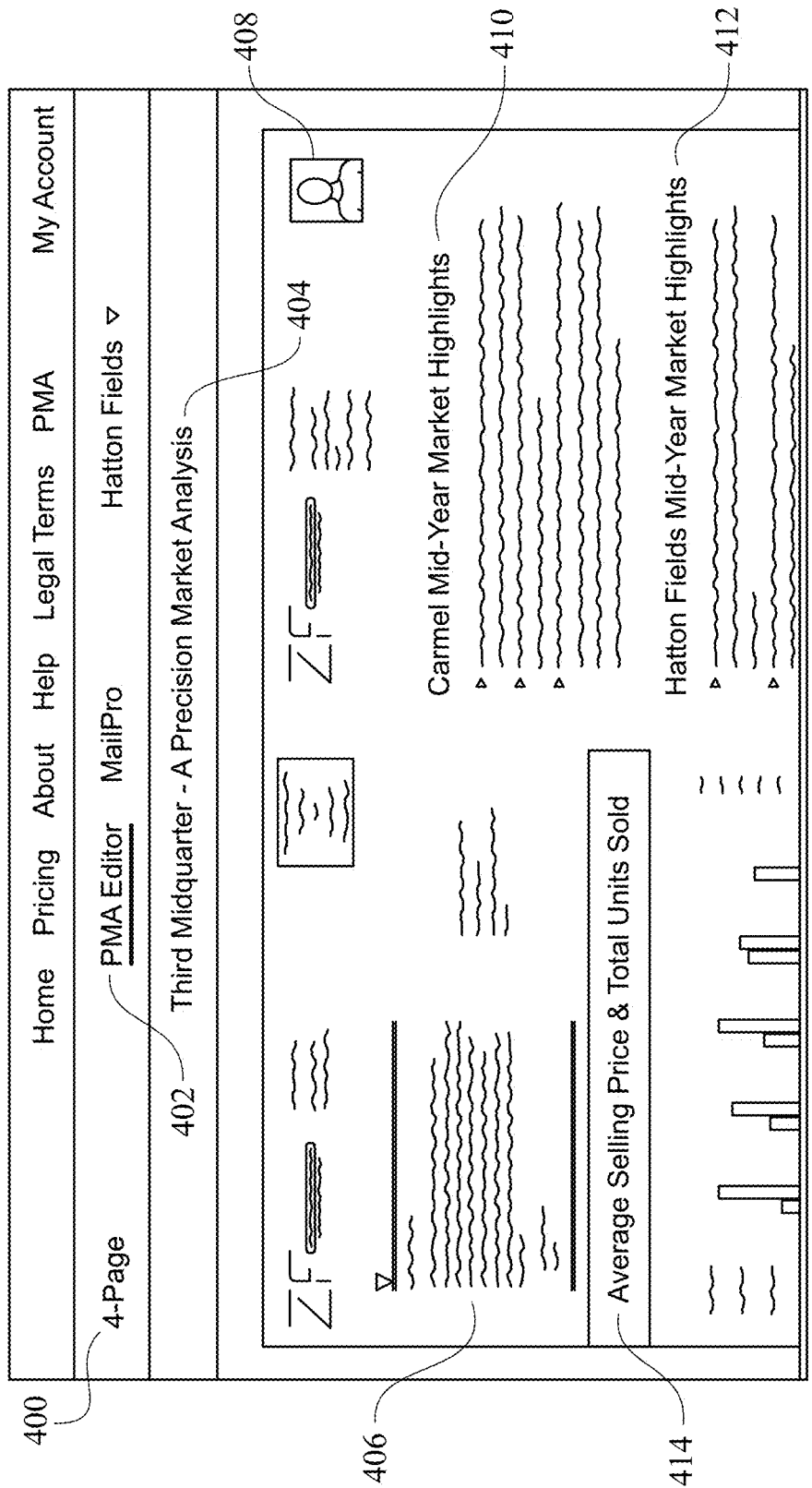
FIG. 4 presents an example of a screenshot associated with the precision market document creation module.

The illustration of FIG. 4 shows an example of a screenshot associated with the PMD creation module 206. The PMD that is being created uses a "4-Page" brochure format. This menu option can be clicked on and the size of the brochure or PMD changed to a different size and/or shape. The "PMA Editor" 402 is shown so the real estate agent 108 can be made aware that the marketing system 100 is in PMD creation mode (as implemented by PMD creation module 206). This PMD is being created for the "third midquarter" 404 and shows a mailing date of Sep. 19, 2019. The PMD includes a personal or global note 406 that the real estate agent 108 enters using the communication module 204, which can be edited and saved. Information 408 about the real estate agent 108 is shown in the PMD, including a photograph of the real estate agent 108, and the logo and address of the real estate company. Information about the "market highlights" for different cities or suburbs, such as Carmel 410 and Hatton Fields 412, for example, are inserted into the PMD in the areas shown. Information about the average selling price 414 is shown underneath the personal and/or global note 406.

Figure 5:
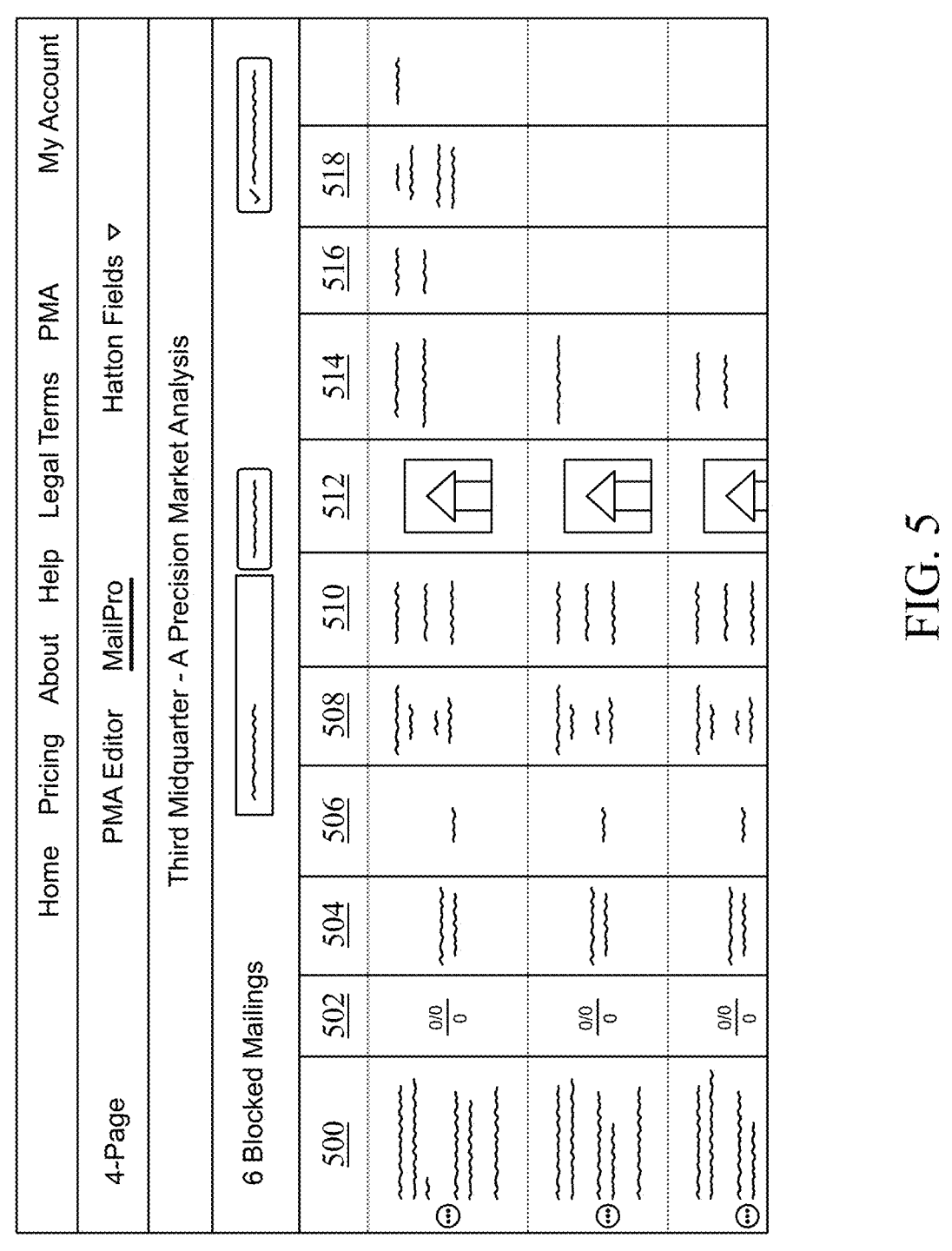
Figure 6A:
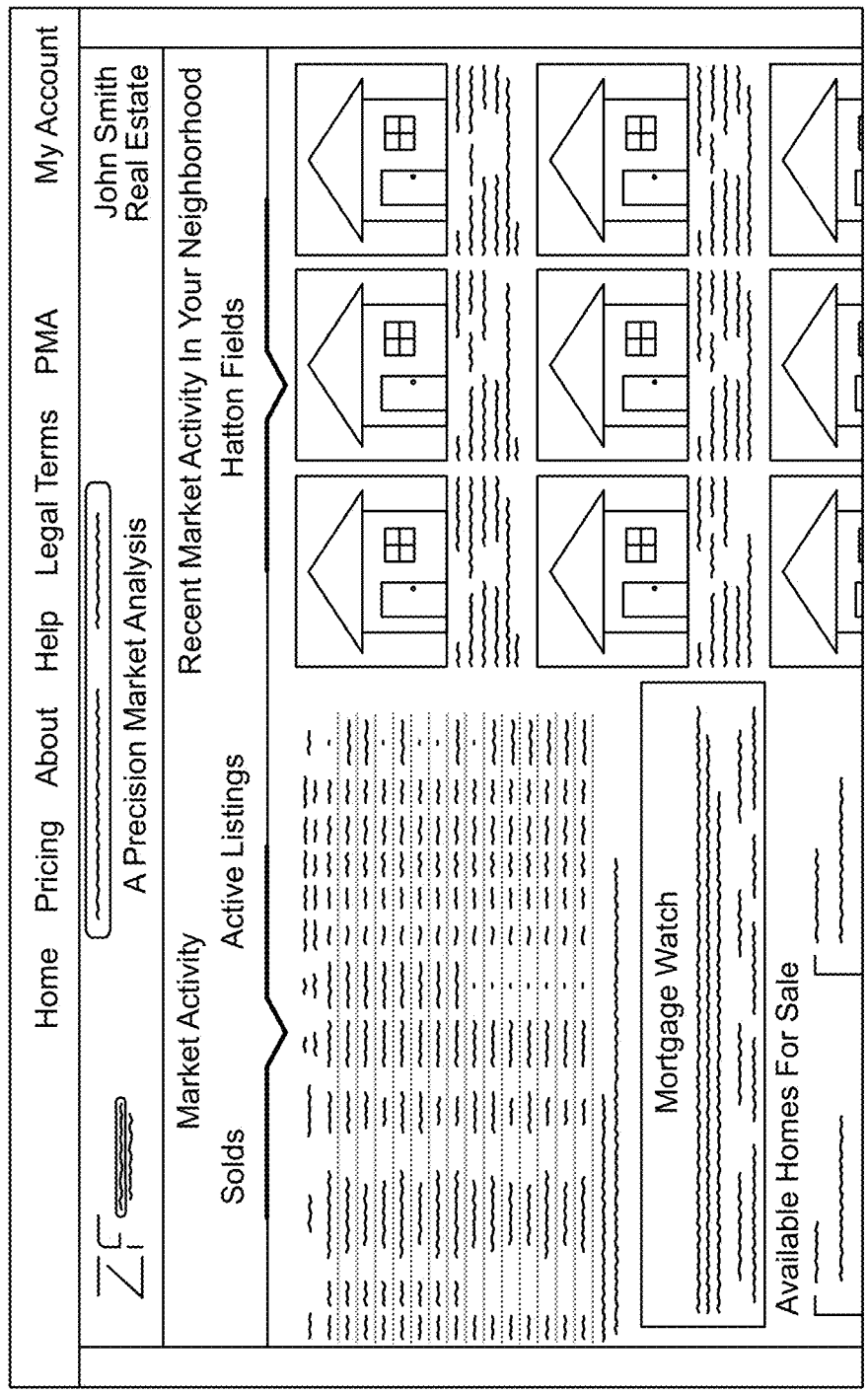
FIGS. 6A and 6B present an example of a precision market document showing where and how information is presented in a precision market document.
Figure 6B:
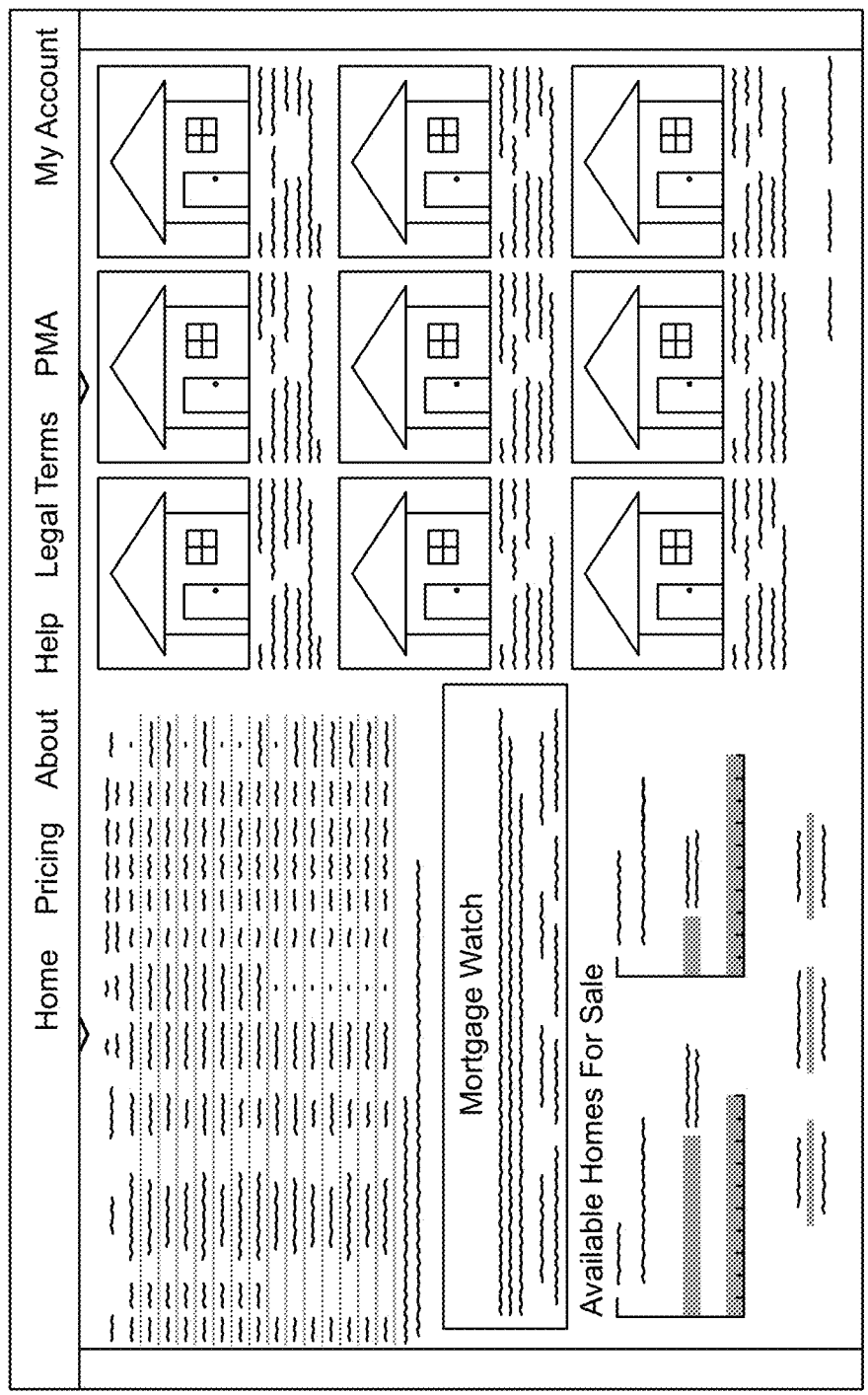
Figure 7:
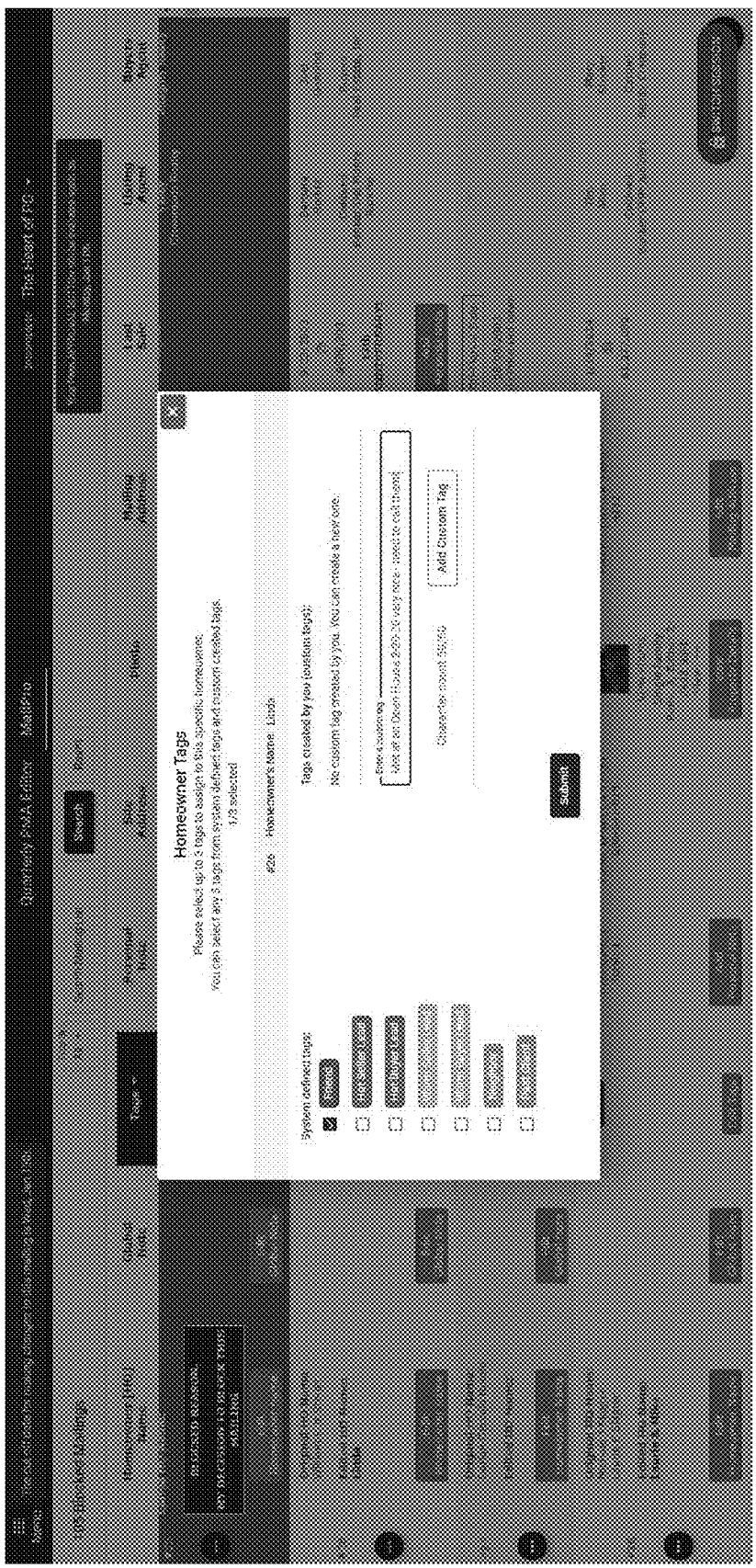
Figure 8:
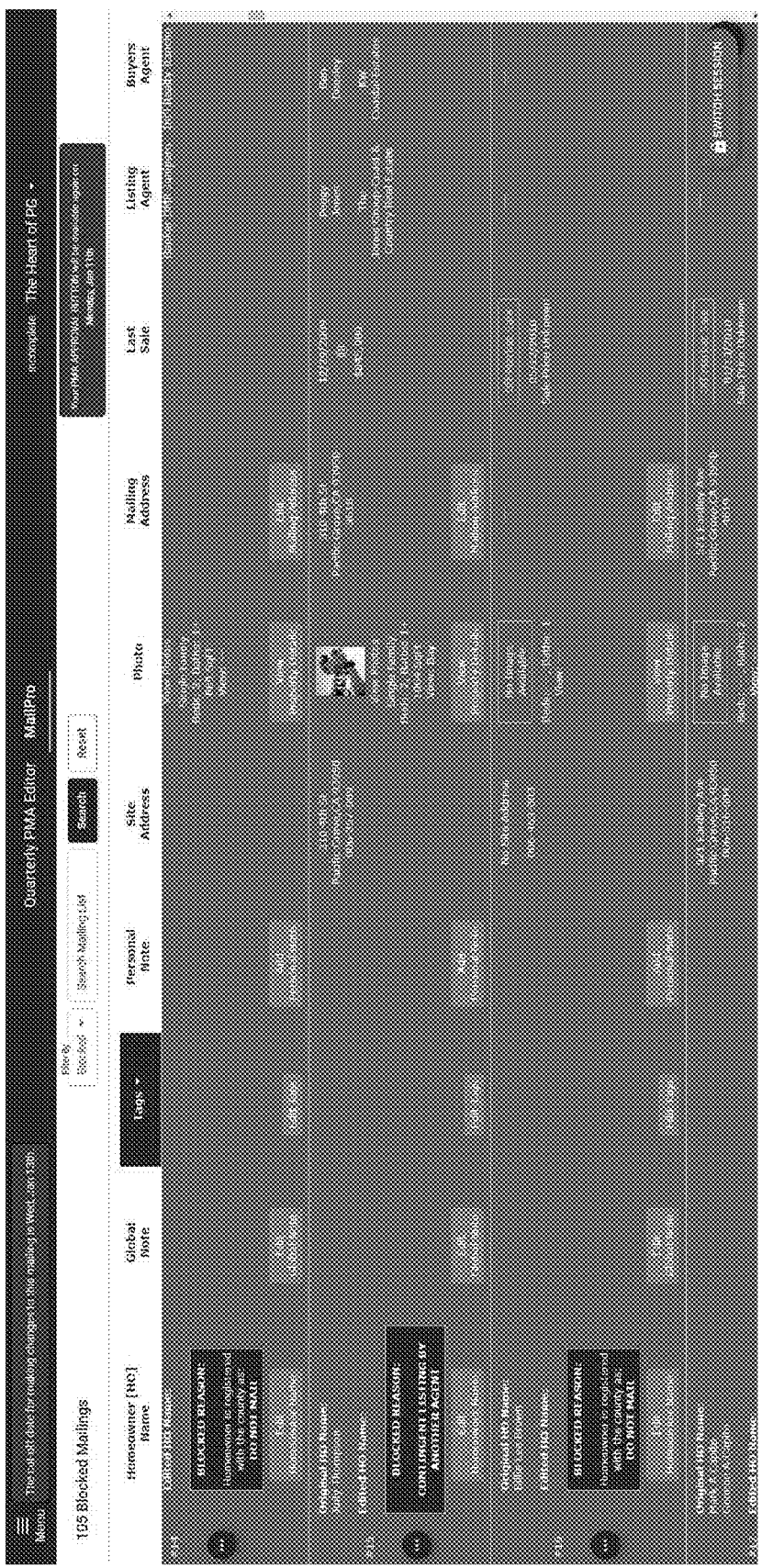
Figure 9:
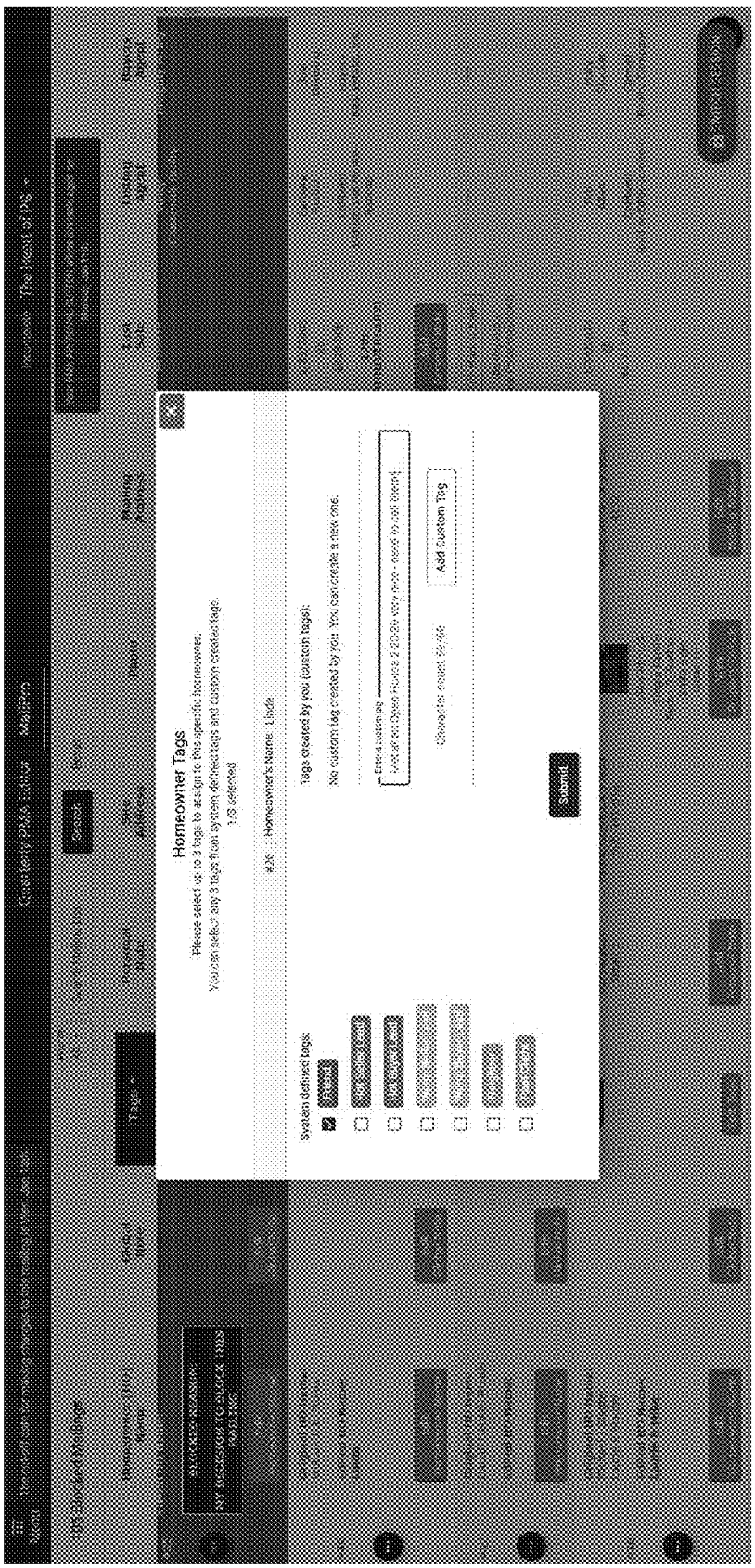
Figure 10:
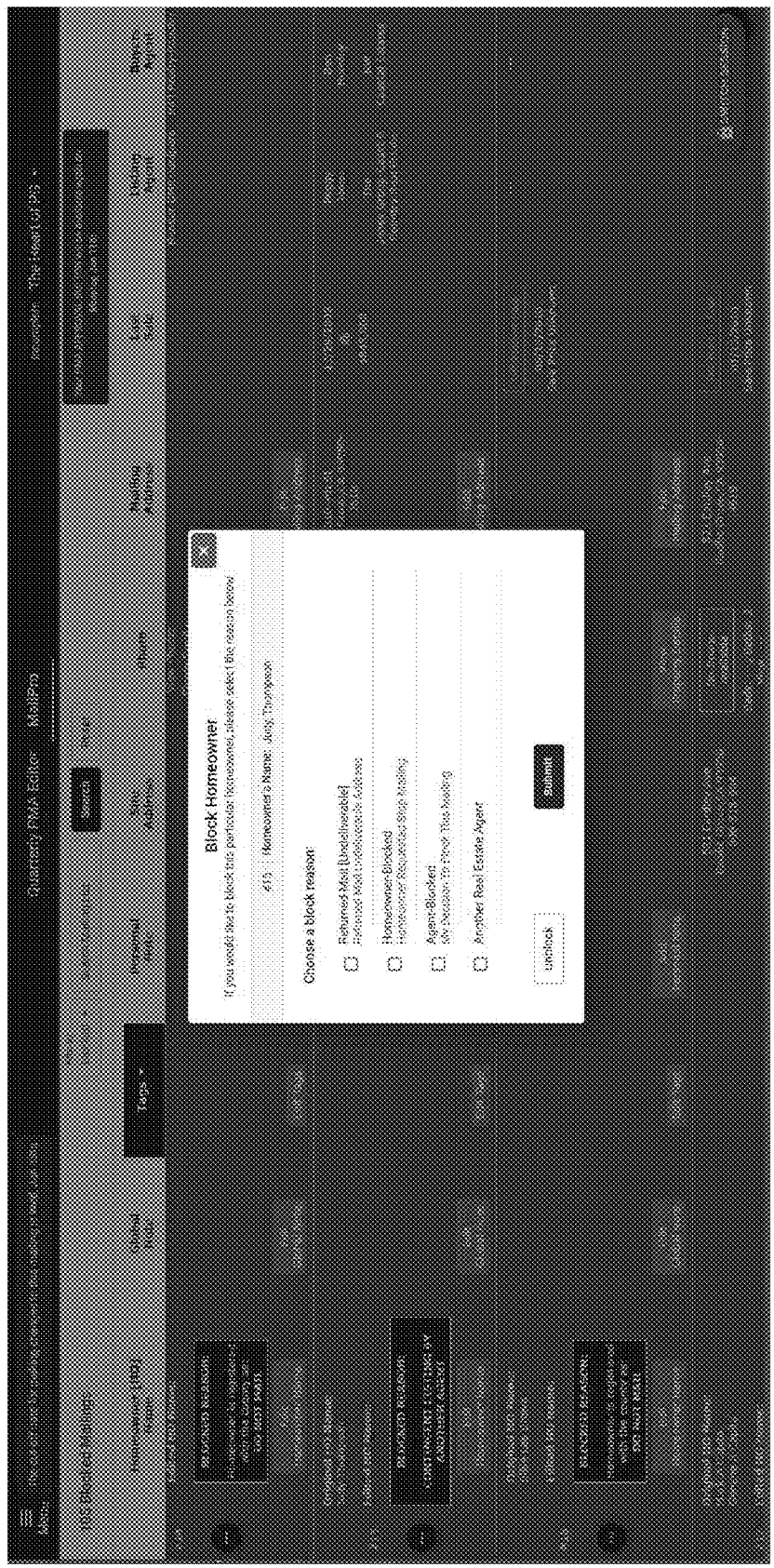
Figure 11:
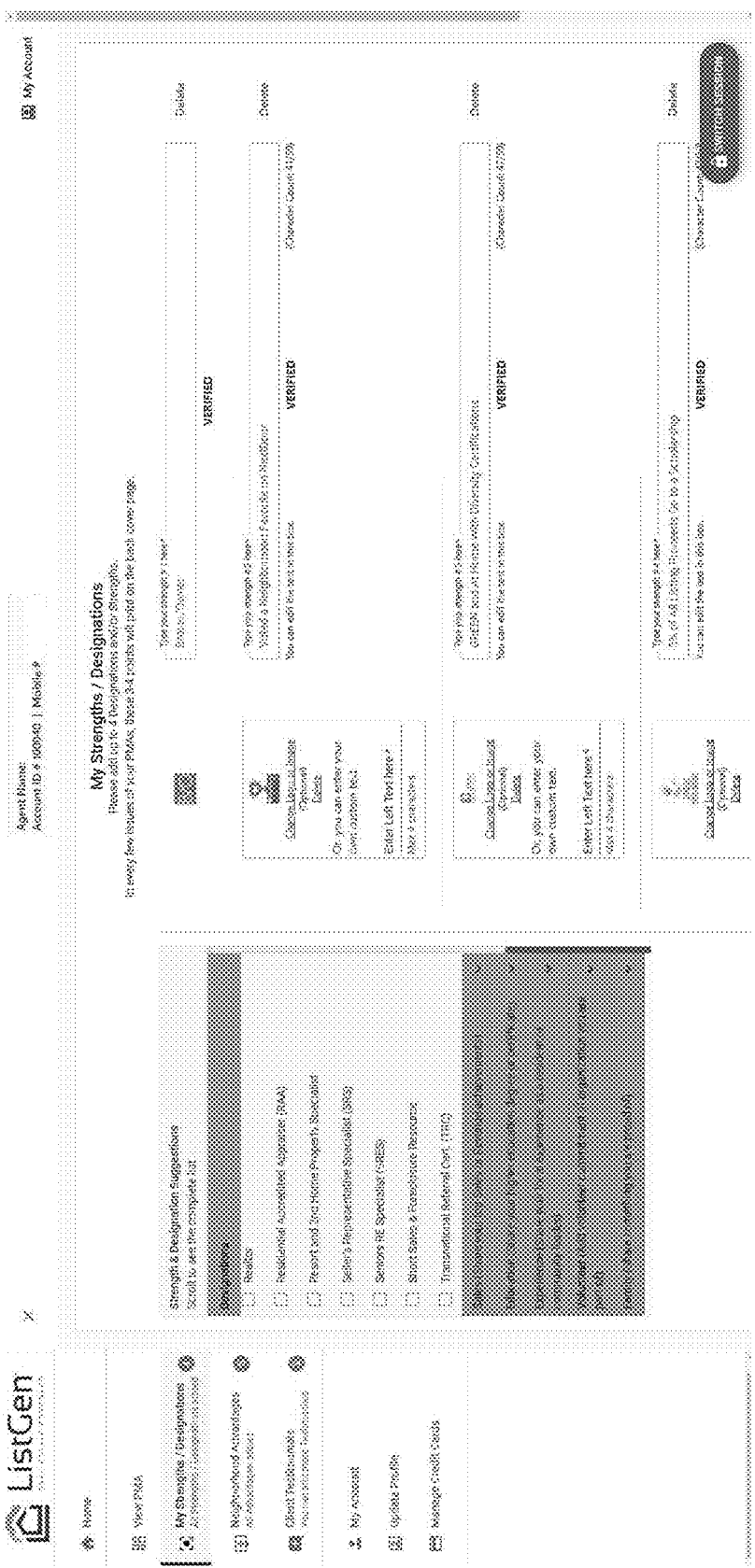
Figure 14:
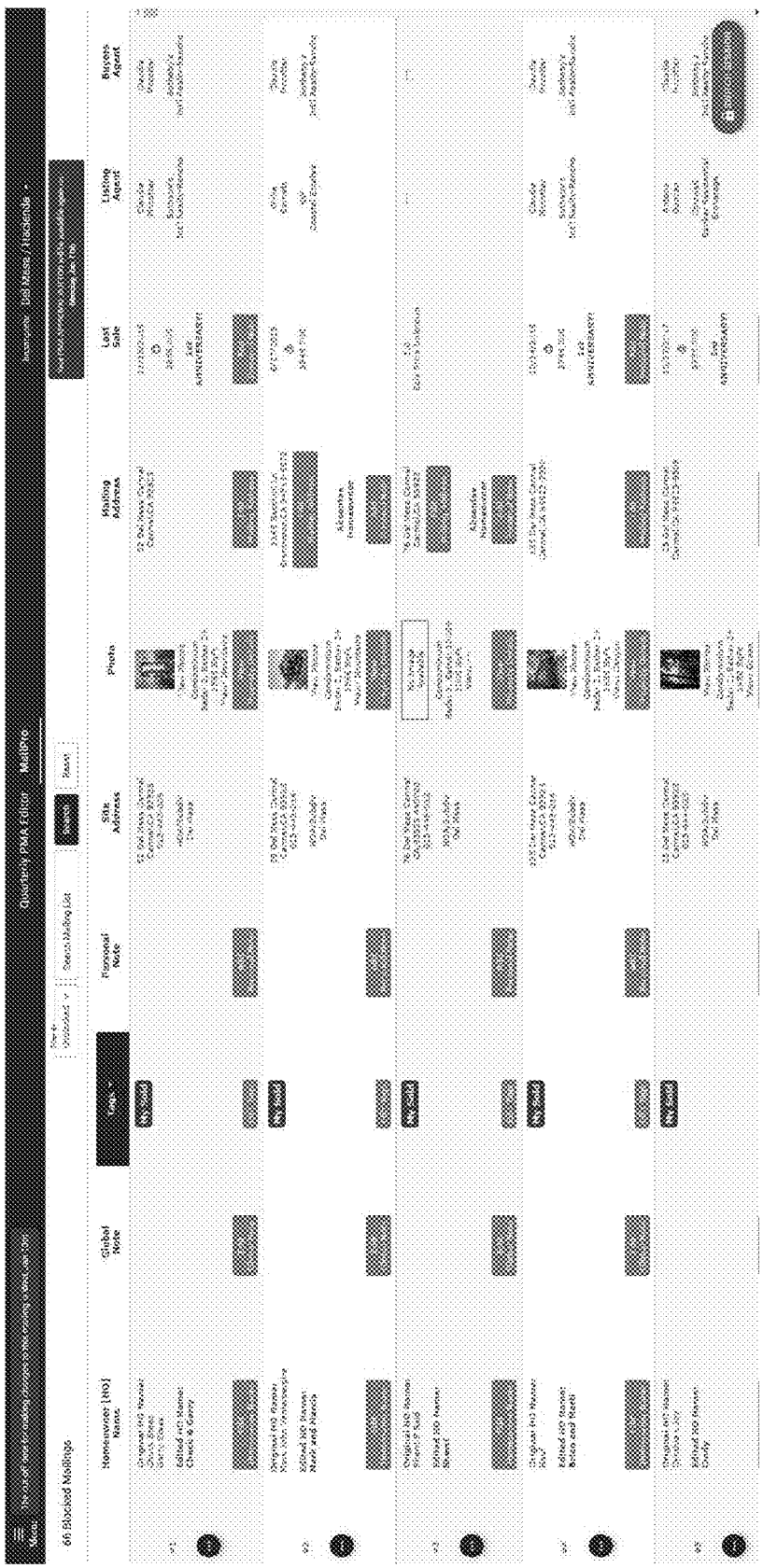

The illustration of FIG. 5 shows an example of screenshot associated with a mailing list. The first column 500 shows information about each of the homeowners' names, including their legal name and an edited or more personal name or nickname. The second column 502 shows the activity associated with the homeowner's website, including how many times a homeowner visited it, how many times a different another person visited it and the number of inquiries. In column 504, it shows a global note that will be attached to or inserted into the corresponding PMD. In column 506, it shows the tags to which the homeowner belongs, including for example, a tag for this homeowner to be included in the distribution of the "Third Midquarter" PMD which will be mailed on "Sep. 19, 2019". In column 508, it shows a personal note that the agent can enter for a particular homeowner. In column 510, it shows the property address associated with the homeowner, while column 512 shows one or more photographs and information about the characteristics of the house if available. Column 514 shows a mailing address for the homeowner. Column 516 displays information about the last sale of the property, while column 518 shows the agent who sold the property The illustrations of FIGS. 6A and 6B show an example of a PMD, including where and how information is presented in a PMD. Said illustrations are overlapping screen print-outs. This information in this PMD is for Hatton Fields.

The illustrations to FIGS. 7 through 24 show an example of screenshots associated with the variety of modules offered by the system and as explained above. The system allows an agent, amongst a variety of additional features, the ability to add personal agent information such as agent credentials, school degrees, certifications, locations where they work, personal photos, tag lines, a personal logo, accomplishments, awards, and a number of other personal information the agent wishes to share. The system also allows the agent to include written text boxes on the PMD that include client testimonials, explanations of features that come along with particular properties, neighborhood news, and statistics. The agent may also include marketing plans of actions in great detail that shows recipients the agent's ability to help them with their desired outcome.

Figure 21:
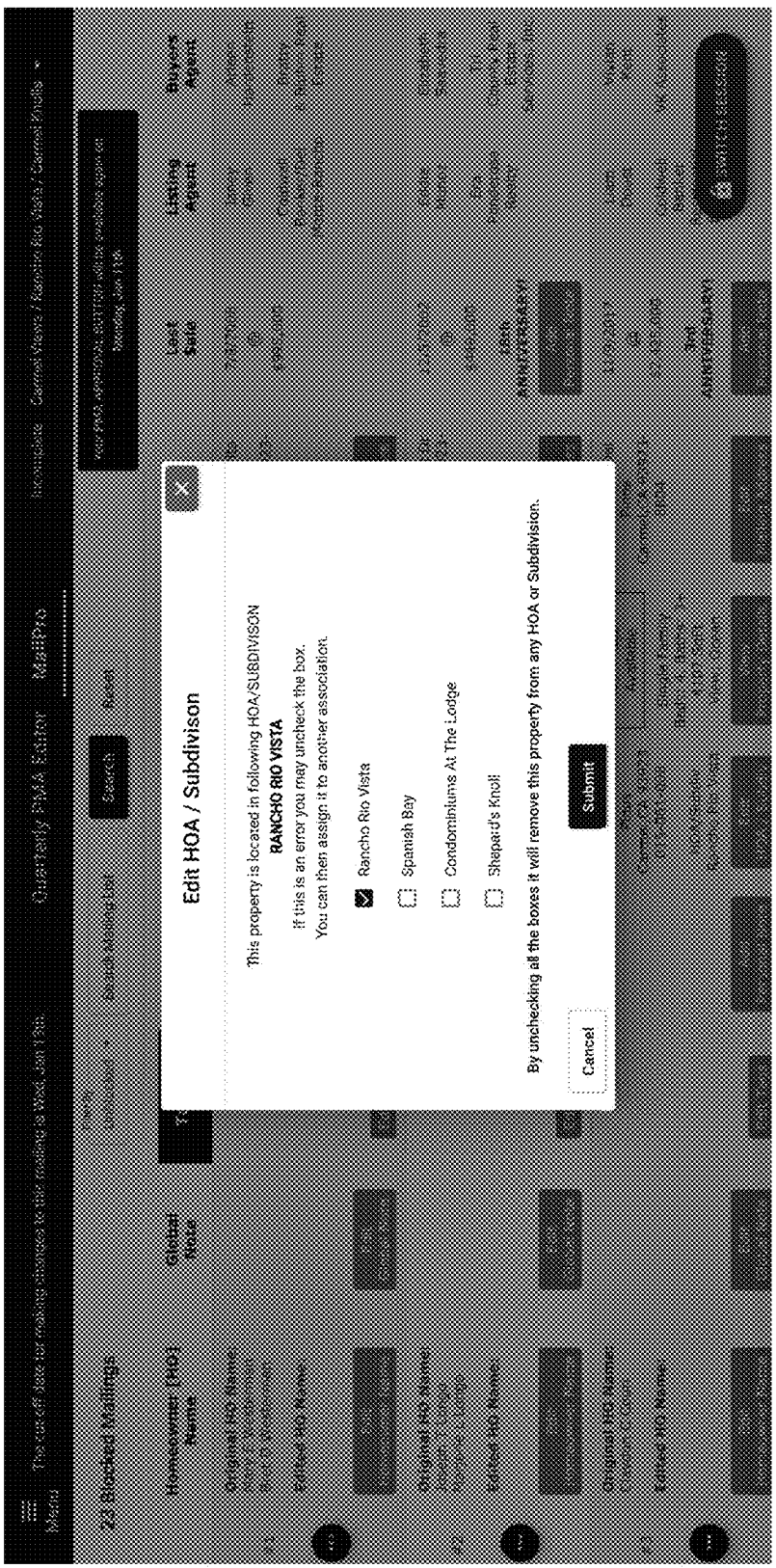
Figure 22:
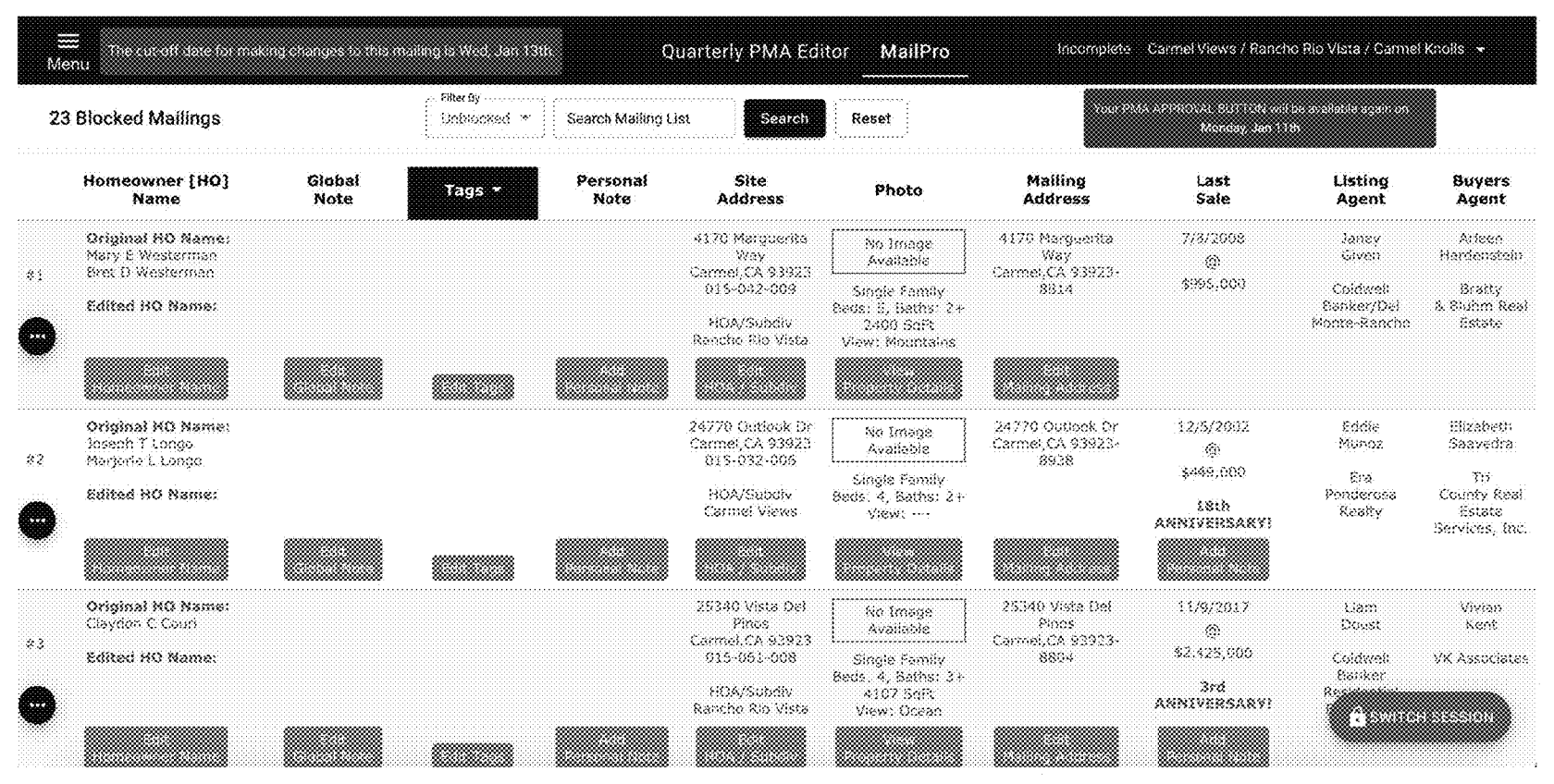

For example, as shown in the accompanying figures, and in particular FIGS. 21 and 22, an agent may select an edit HOA/subdivision button to customize the PMD. After selecting the edit HOA/subdivision button, a modal appears that allows the user to assign that specific property to any HOA or subdivision. Many times the public or private databases where the vast majority of properties are listed drops the names of the HOA or altogether excludes them in their database. This can make the market analytics inaccurate by omitting even just two or three homes that should have been in that HOA or subdivision. One of the great advantages of the instant marketing system, and in particular, the micro-market module is that the agent has the ability to add or move homes in and out of HOAs or subdivisions. For instance, as shown in FIGS. 21 and 22, the agent can edit, add, or remove the name of a property associated with a particular HOA. This allows each agent who knows their mailing geographic areas/neighborhoods intimately, the ability to move homes in and out of micro-markets such as condo associations and subdivisions.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A computer-network-based, marketing system accessible by a real estate agent via an electronic device in digital communication with a computer network comprising:
   an agent's property list (APL) selection module for displaying a set of properties, receiving one or more selections from an agent to select a subset of one or more properties from the set of properties, and saving the selected subset of one or more properties in a memory;
   a tagging module for displaying the selected subset of one or more properties, receiving one or more instructions from an agent to group one or more of the properties comprised in the subset into one or more tagged groups, and saving the one or more tagged groups;
   an editing module for adding and saving a message associated with the one or more tagged groups;
   a document creation module for creating and saving one or more documents configured to be mailed to the one or more properties in the subset or to the one or more properties in the one or more tagged groups, each of the one or more documents comprised of different information;
   a mailing module for associating the one or more documents with the one or more tagged groups into one or more mailing lists, and saving the one or more mailing lists, wherein each of the one or more mailing lists is comprised of the one or more documents and the one or more tagged groups;

a scheduling module for scheduling a date and time for when the one or more mailing lists is sent to a printer, where the printer will create a physical version of the one or more documents including the information associated with a particular document, a name, an address, and any message associated with the one or more tagged groups;

a communication module for electronically communicating with third parties; and a prediction module in communication with the communication module for predicting which homeowners may be interested in selling their house and for managing a marketing campaign to target such homeowners, wherein the prediction module gathers data from third parties on the set of properties to generate and assign a probability score to each homeowner, the probability score is calculated based on one or more data points extracted from the data, wherein the prediction module based on the probability score automatically makes a determination of, if the probability score is below a threshold number, do nothing, if the probability score is above the threshold number, the prediction module performs the following operations;

automatically sends a signal to the tagging module to create a list of tagged potential sellers; and the tagging module automatically sends a signal to the document creation module to create one or more of the physical versions or electronic versions of the one or more documents to send to the homeowners of the tagged potential sellers.

2. The computer-network-based, marketing system of claim 1, wherein the marketing system includes a web-based platform executing the APL selection module, the web-based platform accessible over a network and including an authentication server requiring the agent to enter an encrypted password to gain access to the APL selection module.

3. The computer-network-based, marketing system of claim 1, wherein the editing module includes a note personalization function allowing the agent to create custom personalized notes to individual properties from the one or more tagged groups.

4. The computer-network-based, marketing system of claim 1, wherein the one or more tagged groups comprise homeowners, sellers or buyers.

5. The computer-network-based, marketing system of claim 1, wherein the marketing system includes a notification and reminder module for notifying the agent through electronic notifications of deadlines requiring action.

6. The computer-network-based, marketing system of claim 5, wherein the electronic notifications are electronically communicated to an electronic device accessible to the agent, the notifications comprising any one of a SMS message, iMessage, email, pop-ups, or automated voice call.

7. The computer-network-based, marketing system of claim 1, wherein the document creation module includes a customization function that allows the agent to select, promote, and otherwise bring attention to a selected number of properties and provide customized information regarding the selected number of properties in the document.

8. The computer-network-based, marketing system of claim 1, wherein the marketing system is capable of interfacing with public or proprietary databases to obtain targeted information that is convertible into readable displayables that are selectively added to the document that is printable.

9. The computer-network-based, marketing system of claim 8, wherein the displayables includes any combination of graphs, charts, writings, reports, images, scannable imagery, or tables.

10. The computer-network-based, marketing system of claim 1, wherein the marketing system is capable of interfacing with public or proprietary databases to identify market changes occurring and notify the agent of the market changes via an electronic communication notification.

11. The computer-networked-based, marketing system of claim 1, wherein the marketing system is capable of interfacing with public or proprietary databases to identify at least one specific property within a larger subset of similar properties, allowing the agent to tag and add the at least one specific property to the document to be mailed.

12. The computer-networked-based, marketing system of claim 1, wherein the marketing system includes an optimized market analysis module that parses through data provided by a public or proprietary database to analyze market conditions, trends, and preferred data points and creates a hierarchical list from a plurality of displayable data, with the hierarchical list being displayable on the document that is printable.

13. The computer-networked-base, marketing system of claim 12, wherein the displayable data comprises any one of an average sale price of a property, average days on market of a property, average percentage received of asking price of a property, an inventory level of similar properties, a price reductions of at least one property, and an indication whether it is a seller's or a buyer's market.

14. The computer-networked-base, marketing system of claim 12, wherein only three of the plurality of displayable data is hierarchically displayed on the document that is printed.

15. The computer-networked-base, marketing system of claim 14, wherein at least one of the three of the plurality of displayable data is an average sale price of properties.

16. The computer-networked-base, marketing system of claim 1, wherein the physical version of each document received by each respective homeowner includes an authentication user name and password that grants the homeowner access to a custom-tailored digital media page.

17. A computer-network-based, marketing system accessible by a real estate agent via an electronic device in digital communication with a computer network comprising:

an agent's property list (APL) selection module for displaying a set of properties, receiving one or more selections from an agent to select a subset of one or more properties from the set of properties, and saving the selected subset of one or more properties in a memory;

a web-based platform executing the APL selection module, the web-based platform accessible over a network and includes an authentication server requiring authentication to gain access to the APL selection module;

a tagging module for displaying the selected subset of one or more properties, receiving one or more instructions from an agent to group one or more of the properties comprised in the subset into one or more tagged groups, and saving the one or more tagged groups;

an editing module for adding and saving a message associated with the one or more tagged groups;

a document creation module for creating and saving one or more documents configured to be mailed to the one or more properties in the subset or to the one or more properties in the one or more tagged groups, each of the one or more documents comprised of different information;

a mailing module for associating the one or more documents with the one or more tagged groups into one or more mailing lists, and saving the one or more mailing lists, wherein each of the one or more mailing lists is comprised of the one or more documents and the one or more tagged groups;

a scheduling module for scheduling a date and time for when the one or more mailing lists is sent to a printer, where the printer will create a physical version of the one or more documents including the information associated with a particular document, a name, an address, and any message associated with the one or more tagged groups;

a communication module for electronically communicating with third parties;

a notification and reminder module for notifying the agent through electronic notifications of deadlines requiring action; and a prediction module in communication with the communication module for predicting which homeowners may be interested in selling their house and for managing a marketing campaign to target such homeowners,
wherein the prediction module gathers data from third parties on the set of properties to generate and assign a probability score to each homeowner, the probability score is calculated based on one or more data points extracted from the data,
wherein the prediction module based on the probability score automatically makes a determination of,
if the probability score is below a threshold number, do nothing,
if the probability score is above the threshold number, the prediction module performs the following operations;
automatically sends a signal to the tagging module to create a list of tagged potential sellers; and
the tagging module automatically sends a signal to the document creation module to create one or more of the physical versions or electronic versions of the one or more documents to send to the homeowners of the tagged potential sellers.

18. The computer-network-based, marketing system of claim 17, wherein the marketing system is capable of interfacing with public or proprietary databases to obtain targeted information that is convertible into readable displayables that are selectively added to the document that is printable.

19. The computer-networked-based, marketing system of claim 17, wherein the marketing system includes an optimized market analysis module that parses through data provided by a public or proprietary database to analyze market conditions, trends, and preferred data points and creates a hierarchical list from a plurality of displayable data, with the hierarchical list being displayable on the document that is printable.

20. A computer-network-based, marketing system accessible by a real estate agent via an electronic device in digital communication with a computer network comprising:

an agent's property list (APL) selection module for displaying a set of properties, receiving one or more selections from an agent to select a subset of one or more properties from the set of properties, and saving the selected subset of one or more properties in a memory;

a web-based platform executing the APL selection module, the web-based platform accessible over a network and includes an authentication server requiring authentication to gain access to the APL selection module;

a tagging module for displaying the selected subset of one or more properties, receiving one or more instructions from an agent to group one or more of the properties comprised in the subset into one or more tagged groups, and saving the one or more tagged groups;

an editing module for adding and saving a message associated with the one or more tagged groups;

a document creation module for creating and saving one or more documents configured to be mailed to the one or more properties in the subset or to the one or more properties in the one or more tagged groups, each of the one or more documents comprised of different information;

a mailing module for associating the one or more documents with the one or more tagged groups into one or more mailing lists, and saving the one or more mailing lists, wherein each of the one or more mailing lists is comprised of the one or more documents and the one or more tagged groups;

a scheduling module for scheduling a date and time for when the one or more mailing lists is sent to a printer, where the printer will create a physical version of the one or more documents including the information associated with a particular document, a name, an address, and any message associated with the one or more tagged groups;

an optimized market analysis module that parses through data provided by a public or proprietary database to analyze market conditions, trends, and preferred data points and creates a hierarchical list from a plurality of displayable data, with the hierarchical list being displayable on the physical version of the document;

a communication module for electronically communicating with third parties;

a notification and reminder module for notifying the agent through electronic notifications of deadlines requiring action; and a prediction module in communication with the communication module for predicting which homeowners may be interested in selling their house and for managing a marketing campaign to target such homeowners,
wherein the prediction module gathers data from third parties on the set of properties to generate and assign a probability score to each homeowner, the probability score is calculated based on one or more data points extracted from the data,
wherein the prediction module based on the probability score automatically makes a determination of,
if the probability score is below a threshold number, do nothing,
if the probability score is above the threshold number, the prediction module performs the following operations;
automatically sends a signal to the tagging module to create a list of tagged potential sellers; and
the tagging module automatically sends a signal to the document creation module to create one or more of the physical versions or electronic versions of the one or more documents to send to the homeowners of the tagged potential sellers,
wherein the displayable data comprises any one of an average sale price of a property, average days on market of a property, average percentage received of asking price of a property, an inventory level of similar properties, a price reductions of at least one property, and an indication whether it is a seller's or a buyer's market, wherein only three of the plurality of displayable data is hierarchically displayed on the physical version of the document, and wherein at least one of the three of the plurality of displayable data is the average sale price of property.

\* \* \* \* \*